US012750570B2

(12) United States Patent
Dahlgren et al.

(10) Patent No.: US 12,750,570 B2
(45) Date of Patent: Sep. 29, 2026

(54) IMAGE SENSOR SYSTEM, A CAMERA MODULE, AN ELECTRONIC DEVICE AND A METHOD FOR OPERATING A CAMERA MODULE FOR DETECTING EVENTS USING INFRARED

(71) Applicant: Telefonaktiebolaget LM Ericsson (publ), Stockholm (SE)

(72) Inventors: Fredrik Dahlgren, Lund (SE); Alexander Hunt, Tygelsjö (SE); Andreas Kristensson, Södra Sandby (SE); Héctor Caltenco, Oxie (SE); Magnus L Olsson, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 67 days.

(21) Appl. No.: 18/881,779

(22) PCT Filed: Jul. 8, 2022

(86) PCT No.: PCT/EP2022/069031
§ 371 (c)(1),
(2) Date: Jan. 7, 2025

(87) PCT Pub. No.: WO2024/008305
PCT Pub. Date: Jan. 11, 2024

(65) Prior Publication Data

US 2026/0006304 A1 Jan. 1, 2026

(51) Int. Cl.
*H04N 23/11* (2023.01)
*H04N 25/47* (2023.01)
(Continued)

(52) U.S. Cl.
CPC ............. *H04N 23/11* (2023.01); *H04N 25/47* (2023.01); *H04N 25/77* (2023.01); *H04N 25/78* (2023.01); *H04N 25/79* (2023.01)

(58) Field of Classification Search
None
See application file for complete search history.

(56) References Cited

U.S. PATENT DOCUMENTS 7,808,536 B2 10/2010 Yamada et al.
10,110,913 B2 10/2018 Burns et al.
(Continued)

FOREIGN PATENT DOCUMENTS

EP 2117227 B1 5/2014
JP 2004289709 A 10/2004
(Continued)

OTHER PUBLICATIONS

Akin, T. , "CMOS-based Thermal Sensors", Department of Electrical and Electronics Engineering, Middle East Technical University, Ankara, Turkey; Advanced Micro and Nanosystems. vol. 2. CMOS—MEMS., 2005, 479-512.
(Continued)

*Primary Examiner* — James M Hannett
(74) *Attorney, Agent, or Firm* — Murphy, Bilak & Homiller, PLLC

(57) ABSTRACT

An image sensor system (200) sensitive to electromagnetic irradiation and comprising: a first pixel area (210) comprising an array of synchronous first image sensor pixels (211); and an infrared pixel arca (240) comprising infrared image sensor pixels (241, 242) sensitive to infrared irradiation; and a change detector area (230) comprising multiple asynchronous change detectors (231, 232), and a synchronous intensity read-out circuitry (260). A first electromagnetic receptor (215) of a respective first image sensor pixel (211) is electrically coupled to the synchronous intensity read-out circuitry (260). An infrared detector (245) of a respective infrared image sensor pixel (241, 242) is electrically coupled to a respective first asynchronous change detector (231) out of the multiple asynchronous change detectors (231, 232).
(Continued)

The change detector area (230) is a distinct part of the image sensor system (200) which is separate from the pixel areas (210, 240).

17 Claims, 16 Drawing Sheets

(51) Int. Cl.

| | |
|---|---|
| ***H04N 25/77*** | (2023.01) |
| ***H04N 25/78*** | (2023.01) |
| ***H04N 25/79*** | (2023.01) |

(56) References Cited

U.S. PATENT DOCUMENTS

| | | | | |
|---|---|---|---|---|
| 10,283,545 | B2 | 5/2019 | Mlinar et al. | |
| 11,138,428 | B2 * | 10/2021 | Skogö | H04N 23/11 |
| 2012/0293687 | A1 | 11/2012 | Karn et al. | |
| 2014/0009648 | A1 * | 1/2014 | Kim | H04N 23/651<br>348/272 |
| 2015/0097108 | A1 | 4/2015 | Bishay | |
| 2019/0368941 | A1 * | 12/2019 | Aziz | G01J 5/24 |
| 2020/0169675 | A1 | 5/2020 | Stobie et al. | |
| 2021/0185264 | A1 * | 6/2021 | Wong | H04N 23/61 |
| 2022/0157083 | A1 | 5/2022 | Jandhyala et al. | |
| 2023/0007208 | A1 | 1/2023 | Wong et al. | |

FOREIGN PATENT DOCUMENTS

| | | | |
|---|---|---|---|
| KR | 102276863 | B1 | 7/2021 |
| WO | 2020110484 | A1 | 6/2020 |
| WO | 2020170861 | A1 | 8/2020 |
| WO | 2021159231 | A1 | 8/2021 |
| WO | 2023093986 | A1 | 6/2023 |

OTHER PUBLICATIONS

Clady, Xavier , et al., "A Motion-Based Feature for Event-Based Pattern Recognition", Frontiers in Neuroscience, vol. 10, Article 594, Jan. 2017, 1-20.

Delbruck, Tobi , "The development of the DVS and DAVIS sensors", Inst. of Neuroinformatics, University of Zurich and ETH Zurich, 1-40.

Fluke , "How infrared cameras work", Fluke Resource Center, 2022, 1-5.

Lichtsteiner, P , et al., "A 128x 128 120 dB 15 μS latency asynchronous temporal contrast vision sensor", University of Zurich; IEEE Journal of Solid State Circuits, 2008, 1-13.

Teledyne , "HD Thermal Camera with Viewfinder FLIR T1020", 2021, 1-6.

Unknown, Author , "DARPA Announces Research Teams to Develope Intelligent Event-Based Imagers", Defense Advanced Research Projects Agency, Jul. 5, 2021, 1-3.

Wikipedia , "Event camera", Jul. 18, 2021, 1-5.

* cited by examiner

IMAGE SENSOR SYSTEM, A CAMERA MODULE, AN ELECTRONIC DEVICE AND A METHOD FOR OPERATING A CAMERA MODULE FOR DETECTING EVENTS USING INFRARED

TECHNICAL FIELD

The embodiments herein relate to an image sensor system, a camera module, an electronic device, and a method for operating the camera module. A corresponding computer program and a computer program carrier are also disclosed.

BACKGROUND

A digital camera for visual or infrared light comprises a digital image sensor. A sensor area of the digital image sensor usually comprises an array of synchronous image pixels arranged in rows and columns. This kind of sensor may also be referred to as a frame-based sensor. Each image pixel comprises a photoreceptor which is coupled to a read-out circuitry. All pixels are read synchronously with respect to a timing of a shutter.

The sensor area may comprise a certain number of pixels. More pixels usually give a higher resolution. A typical technology used for light sensors is a Complementary Metal-Oxide-Semiconductor (CMOS). This type of sensor requires a certain computational effort and processing power in order to resolve an image and estimate how that image may change over time (motion, shape, depth estimation etc.). There are other technologies for image sensors as well like Charge Coupled Device (CCD), e.g., silicon-based CCDs.

Conventional frame-based sensors may have very high resolution, but typically has slow frame rate at the highest resolutions. Furthermore, data transfer from the sensor to an application processor is high and consumes significant power at high resolution unless the frame rate is quite low. Analyzing content of the images to estimate changes such as motion, blurring (e.g., to assist in focus control), shapes, depth etc., may be rather demanding for computational power when resolution is high.

Some of the above-mentioned drawbacks may be overcome by another type of digital camera sensor e.g., an event-based sensor. The event-based sensor may have different names in the literature, such as event camera, neuromorphic camera, Dynamic Vision Sensor (DVS) or silicon retina. The event-based sensor also comprises a photoreceptor and may use CMOS or CCD technology. The event-based sensor may further be silicon-based. However, instead of measuring an analog value from the photoreceptor with an Analog-to-Digital Converter (ADC), the event-based camera comprises a change detector close to the photoreceptor that triggers a digital value based on the luminance change of a scene. At every change up or down in luminance a trigger is sent to a host, such as an image processor in a camera or in a mobile phone, together with a time stamp and a location. The event-based camera is asynchronous, in contrast to the synchronous image sensor. In other words, the event-based sensor responds to local changes in brightness. Event cameras do not capture images using a shutter as conventional cameras do. Instead, each pixel inside an event camera operates independently and asynchronously, reporting changes in brightness as they occur, and staying silent otherwise.

For example, each pixel of an event-based sensor may store a reference brightness level and may continuously compare the reference brightness level to a current level of brightness. If a difference in brightness exceeds a preset threshold, that pixel may resets its reference level and generate an event: a discrete packet of information containing the pixel address and timestamp. Events may also contain the polarity (increase or decrease) of a brightness change, or an instantaneous measurement of the current level of illumination. Thus, event cameras output an asynchronous stream of events triggered by changes in scene illumination.

The event-based camera has some advantages over the synchronous pixel camera such as: 1) low power consumption as there is no readout circuity and only the pixels that are affected will give an output. 2) High speed, as all pixels do not need to be read at each frame. An event-based camera may detect objects at approximately 10000 times higher speed than conventional synchronous pixel sensors, e.g., 1 000 000 frames per second. 3) High dynamic range, e.g., 100 dB compared to 50 dB for a conventional synchronous pixel sensor.

Image reconstruction from events may be performed and has the potential to create images and video with high dynamic range, high temporal resolution and minimal motion blur. Image reconstruction may be achieved using temporal smoothing, e.g., high-pass or complementary filter.

However, a problem with prior art event-based cameras is that the spatial resolution is low as there is a change detector in each pixel and each change detector is large compared to pixels of synchronous image sensors. The event-based cameras of today have a spatial resolution below 1 megapixel.

There are cameras that combine the two techniques mentioned above, comprising both a conventional sensor and an event-based sensor. The combined sensor may be used with an image analysis solution and may be controlled by decisions made by an application processor, e.g., in a host device, which interfaces both sensors. Drawbacks of such combined systems are multiple: e.g., larger cost and significant more circuit board or silicon die area is usually required, e.g., due to multiple sensor modules with their respective lens systems.

There have also been a few attempts to integrate synchronous pixel functionality into a pixel of an event-based sensor. Asynchronous Time-Based Image Sensor (ATIS) is one prior art solution where the change detector triggers a second pixel to also measure a grayscale value in that pixel. This is a pure event-based solution, with a luminance value as well. However, the pixels of this solution are very big as there are two photoreceptors.

Another prior art solution is Dynamic and Active-pixel Vision Sensor (DAVIS) which uses the same photoreceptor for both the change detector and an Active Pixel Sensor (APS).

In the DAVIS camera each DAVIS pixel triggers on a luminance change asynchronously and will also with certain intervals synchronously take a full frame image. Apart from each DAVIS pixel being large, resulting in a low image resolution, the active synchronous sensor consumes a lot of power compared to the event-based sensor.

As indicated above, the event-based sensors may detect very rapid movements but have very low resolution since they have sparsely distributed pixels due to their complex and space demanding implementation. They are good at detecting movements but typically not that good to resolve the content of an image in any significant resolution and instead require post-processing in the application processor to create images that may be used to determine the content of a scene.

In addition, event cameras, or DVS sensors, have a potential drawback when there are many changes in the frame, for example, in an outdoor scenery where wind is blowing in the trees and there are a lot of movements, or when large or close-up objects are moving covering large part of the field of view. This is especially prominent for low-power sensors, in environments where there is a significant number of ambient movements in the scene or image. This may also relate to certain minor movements of the sensor hardware, e.g., when the camera itself is moving, leading to many pixels reacting on luminance changes and thereby start streaming values even if nothing significant has really changed in the scene.

SUMMARY

An object of embodiments herein is to obviate some of the problems mentioned above related to image sensors. For example, the synchronous sensors are slow and power hungry, while the asynchronous sensors produce low-resolution images and/or are bulky. Combined sensors are very complex to produce and complex to operate and still usually do not provide high-resolution images due to size limitations.

The operation of combined sensors is usually both a power hungry and/or slow process. For example, for higher speed both the two sensor types may need to operate in parallel and transfer data to the application processor for analysis.

If only one sensor type is operational at a time and the other sensor should be activated based on triggering effects from the sensor being operational, this is a slow process due to the decoupled systems-data is transferred from one sensor (e.g., DVS) to the application processor, which analyzes the data in order to detect trigger conditions for the synchronous sensor which may lead to a control signal on an updated setting for the synchronous sensor to act in a certain way.

Further, existing infrared or near-infrared sensors are not designed to adapt to movement or differences in the scene but produce data synchronously, as conventional active pixel sensors do, whereas DVS or event cameras produce data streams only at dynamic changes. Whereas it is possible to combine different sensors to achieve advanced combined control depending on varying conditions, e.g., high-resolution RGB sensor, IR sensor, DVS sensor, such control and optimizations are handled in an application processor or combined circuit in a host device controlling each individual sensor. This leads to increased cost due to multiple sensors, longer latencies since triggering condition based on activities in one sensor must be interpreted by another circuit which then may change the setting of another sensor circuit, or power consumption since multiple sensors are simultaneously active.

Thus, a problem is to discriminate against non-significant changes of the luminance or minor movements of the sensor hardware.

Embodiments disclosed herein try to solve the above-mentioned problems by utilizing thermal imaging via IR sensors. Such IR sensors may include thermal radiation sensors, thermal converters, and thermal flow sensors which allow thermal imaging of an environment and a possibility to detect warm objects, such as people with excellent resolution and image quality. Such IR sensors may be CMOS-based.

According to a first aspect, the object is achieved by an image sensor system sensitive to electromagnetic irradiation. The image sensor system comprises:

a first pixel area comprising an array of synchronous first image sensor pixels, and an infrared pixel area comprising infrared image sensor pixels sensitive to infrared irradiation, a change detector area comprising multiple asynchronous change detectors, and a synchronous intensity read-out circuitry, wherein a first electromagnetic receptor of a respective first image sensor pixel is electrically coupled to the synchronous intensity read-out circuitry, and wherein an infrared detector of a respective infrared image sensor pixel is electrically coupled to a respective first asynchronous change detector out of the multiple asynchronous change detectors, wherein the change detector area is a distinct part of the image sensor system which is separate from the pixel areas.

According to a second aspect, the object is achieved by a camera module comprising the image sensor system according to the first aspect.

According to a third aspect, the object is achieved by an electronic device comprising the camera module according to the second aspect.

According to a fourth aspect, the object is achieved by a method for operating a camera module according to the second aspect. The camera module comprises the image sensor system according to the first aspect. The method comprises:

determining, by a Digital Processing Unit, DPU, of the camera module, a setting of the image sensor system based on output from the infrared image sensor pixels, and controlling the image sensor by implementing the setting.

According to a further aspect, the object is achieved by a computer program comprising instructions, which when executed by a camera module causes the camera module to perform actions according to the fourth aspect above.

According to a further aspect, the object is achieved by a carrier comprising the computer program of the further aspect above, wherein the carrier is one of an electronic signal, an optical signal, an electromagnetic signal, a magnetic signal, an electric signal, a radio signal, a microwave signal, or a computer-readable storage medium.

Since the image sensor system comprises the first pixel area comprising an array of synchronous first image sensor pixels and the infrared pixel area electrically coupled to the respective first asynchronous change detector the image sensor system is able to capture high-resolution synchronous images while discriminating against non-significant changes of the luminance or minor movements of the sensor hardware.

Since the camera module comprises the DPU that determines the setting of the image sensor system based on output from the asynchronous infrared image sensor pixels, and then implements the setting, the camera module decreases both time and power required to control the image sensor system. For example, other pixel areas than the infrared pixel area may be in a low-power state until the output from the infrared pixel area triggers activation of one or more other pixel areas.

For example, the synchronous part of the image sensor may be at least partially inactive or operate at a low frame rate until the output from the asynchronous change detectors triggers the camera module to activate the synchronous image sensor, e.g., based on a detected motion into the field of view based on the output from the asynchronous change detectors.

Thus, such event-based IR cameras may operate asynchronously and only transmit information about IR pixels that have changed, producing significantly less data and operate with much lower latency and power than traditional IR cameras.

A further advantage of some embodiments herein is that only a single lens system is required. Further, embodiments herein only require one interface to an application processor.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
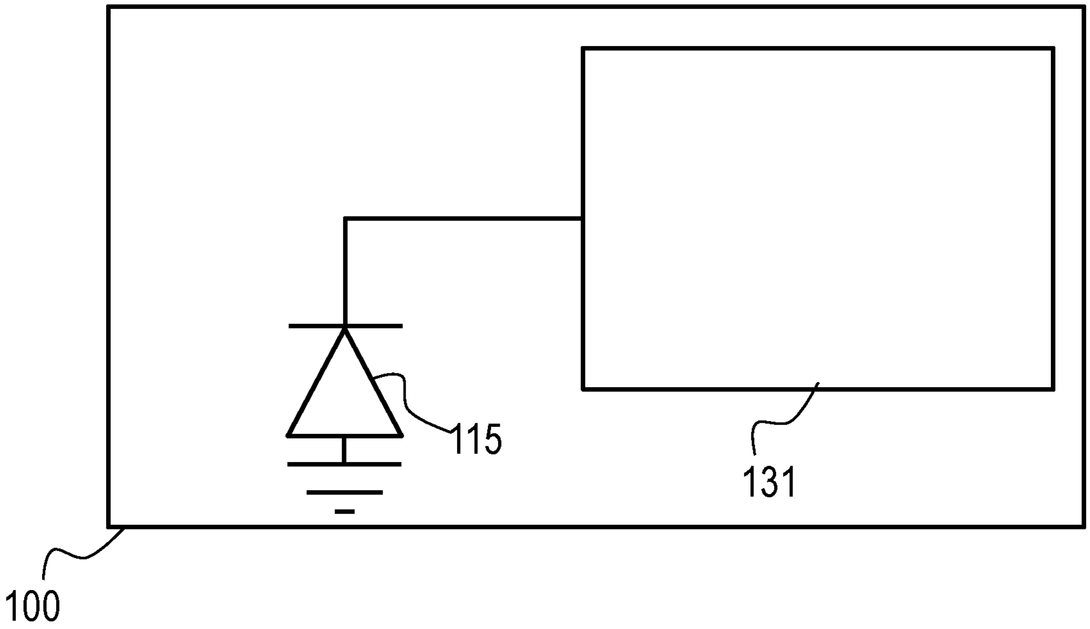
FIG. 1 illustrates an exemplifying embodiment of a prior art hybrid image sensor pixel.

FIG. 1 schematically illustrates an example of a reference hybrid pixel 100. The reference hybrid pixel 100 comprises a photoreceptor 115 and a change detector 131. The photoreceptor 115 may be electrically connected to an intensity readout circuit (not shown) and to the change detector 131. The intensity readout circuit may be part of an Active Pixel Sensor (APS). Thus, the hybrid pixel 100 may be defined as a combination of an active, or in other words a synchronous pixel, and an event-based pixel, or in other words an asynchronous pixel.

The change detector 131 may be implemented in various known ways. For example, the change detector may comprise any one or more of a logarithmic photoreceptor circuit, a differencing circuit that amplifies changes with high precision, and two-transistor comparators. The photoreceptor circuit may be configured in a transimpedance configuration which converts the photocurrent logarithmically into a voltage and also holds the photodiode clamped at a virtual ground. The photoreceptor output may be buffered with a source follower to isolate the sensitive photoreceptor from the rapid transients in the differencing circuit. The source follower drives the capacitive input of the differencing circuit. Additionally, the photoreceptor circuit includes the option of adaptive biasing. A following capacitive-feedback inverting amplifier may be balanced with a reset switch that shorts its input and output together, resulting in a reset voltage level. The comparators compare the output of the inverting amplifier against global thresholds that are offset from the reset voltage to detect increasing and decreasing changes. If the input of a comparator overcomes its threshold, an ON or OFF event is generated.

Since the reference hybrid pixel 100 comprises the change detector 131 the reference hybrid pixel 100 is much larger than a pixel used solely for synchronous detection.

As mentioned above, in the DAVIS camera each DAVIS pixel triggers on a luminance change asynchronously and will also with certain intervals synchronously take a full frame image. Apart from each DAVIS pixel being large, resulting in a low image resolution, the active synchronous sensor consumes a lot of power compared to the event-based sensor.

As mentioned above, an object of embodiments herein is to provide an improved image sensor, for example improved over the DAVIS sensor and/or over a sensor comprising the hybrid pixel 100 illustrated in FIG. 1. Specifically, an object of embodiments herein is to discriminate against non-significant changes of the luminance or minor movements of the sensor hardware.

Embodiments herein provide for an integration of an asynchronous IR sensor with a synchronous sensor. The integration allows e.g., to share a lens system for both sensors.

Embodiments disclosed herein may further combine the integrated asynchronous IR sensor and synchronous sensor with an asynchronous visible light sensor (DVS sensor). Then, instead of having the visible DVS sensor continuously stream pixel values for all pixel-level changes in a scene, the IR pixel values (and changes in those) may regulate this visible data stream according to mechanisms based on a few different criteria. This enables the integrated sensor to regulate the data rate from the visible DVS sensor. To save power at both the camera sensor and the receiving host device, transfer of new data may only take place when there are changes in the visible DVS sensor that match the set of thermal (IR) triggering conditions.

Thus, embodiments herein enable to capture high-speed events, for example through the DVS sensor, while discriminating against non-significant changes of the luminance or minor movements of the sensor hardware.

Furthermore, if there are thermal changes with essentially no luminance changes, this integrated sensor system may transmit very little data, further resulting in lower power consumption—a result of the DVS sensor characteristics.

Some embodiments herein disclose image pixels on the same silicon die or other backplane technology that are sensitive to frequencies outside human vision. Embodiments herein also disclose control of an image sensor based on both frequencies inside and outside human vision capabilities to correctly adjust the image sensor control to be able to capture a snapshot or moving images for an image capturing device, such as a camera.

To be able to control the image sensor, selected image pixels are attached to a change detector system that triggers on a specific value change of the connected image pixel. Pixels connected to the change detector system may be inside and outside the human vision capabilities—the latter may be referred to as infrared or thermal pixels. When a detection happens, digital processing and the sensor control may be based on the change detector input. This may set characteristics of the image sensor so that an image or moving images may be captured by the image sensor and sent to a host for further processing and storage.

All this may happen without the interaction of a host system and the image sensor itself may be able to trigger on an event and take the correct decisions to be able to provide input to the host device, which makes its adaptations faster and it reduces the power consumption.

As mentioned above some embodiments herein integrate thermal pixels on the same silicon die as active pixels. For example, integration of CMOS pixels that are sensitive to light in the visible domain and near infrared (NIR) with an IR cut filter to remove the Near Infrared Transmittance (NIRT) part with for example bolometric pixels in CMOS technology to detect mid-infrared (MIR) and/or long-infrared (LIR). For example, active/DVS pixels may be arranged in a centre of an image sensor and thermal pixels may be arranged in a frame outside the active/DVS pixels and further out change detectors may be arranged that are connected to the thermal pixels and selected visible light pixels. Such embodiments are compact as a lens system only need to cover the pixel area out to the change detectors.

Figure 2A:
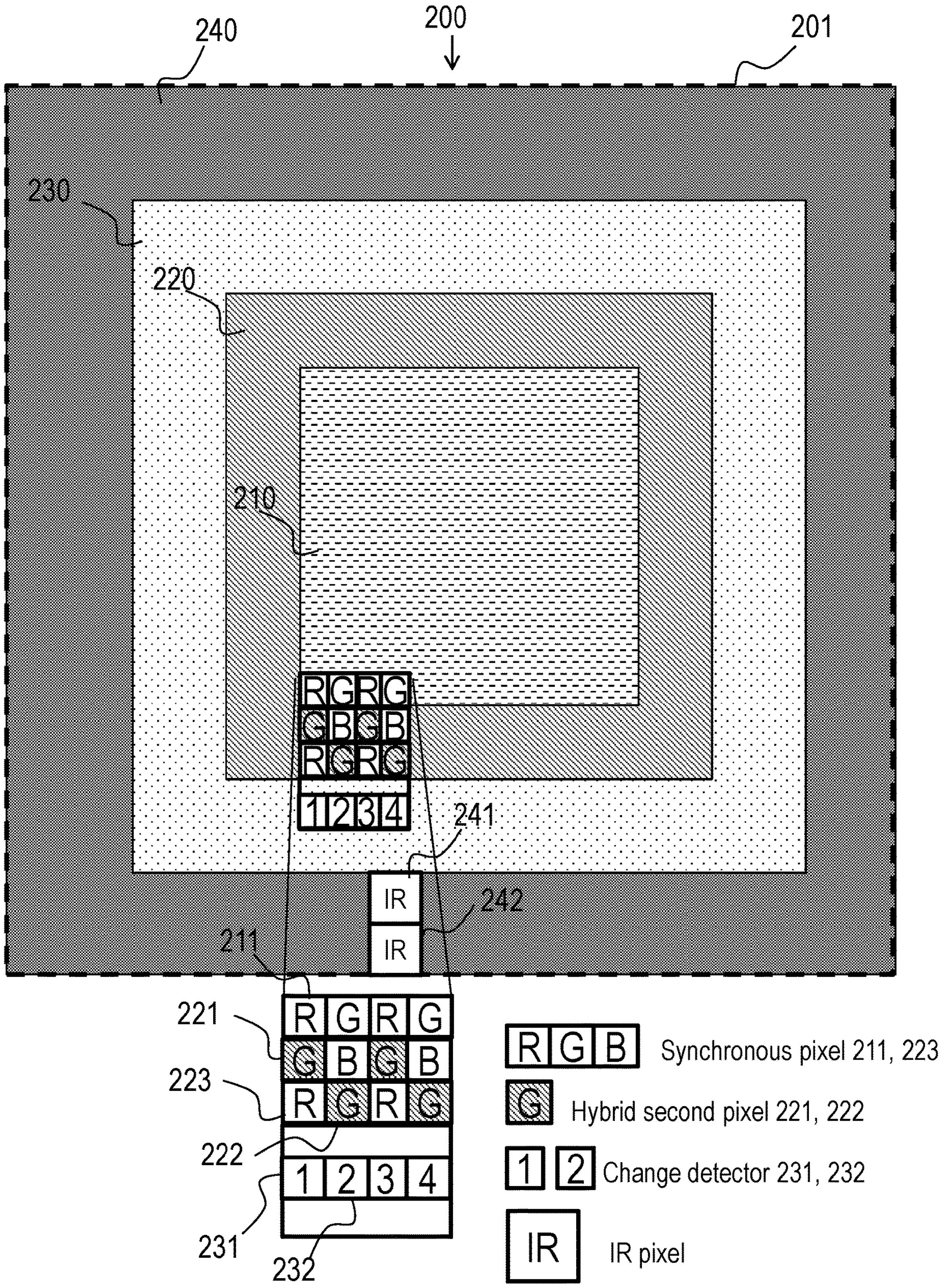
FIG. 2*a* illustrates exemplifying embodiments of an image sensor system.

Embodiments herein will now be described with reference to FIG. 2*a*. FIG. 2*a* schematically depicts an image sensor system 200. The image sensor system 200 may be divided into different areas. In some embodiments, which will be described first, the different areas are arranged on a same plane of the image sensor system 200, such as a same surface plane. In some other embodiments, which will be described later, the different areas may be arranged on different planes of the image sensor system 200.

The image sensor system 200 comprises a pixel area 201 illustrated in FIG. 2*a* as the total area within the hatched line. The pixel area 201 is sensitive to electromagnetic irradiation. The pixel area 201 may also be referred to as an imaging area of the image sensor system 200 onto which a camera system may project an image of an object. FIG. 2*a* shows a surface of the image sensor system 200 which is sensitive to the electromagnetic irradiation. The image sensor system 200 may be sensitive to different electromagnetic wavelength ranges, such as Ultra Violet (UV) light, visible light and Infra-Red (IR) light. Specifically, different parts of the image sensor system 200, such as different pixel areas, may be sensitive to different electromagnetic wavelength ranges.

The surface of the image sensor system 200 may comprise the pixel area 201. When mounted in a camera module the surface may be arranged more or less perpendicular to the optical axis of the camera module.

The image sensor system 200 may be made of semiconductor material, such as silicon, (Si). The image sensor system 200 may be monolithic but the different parts, such as different pixel areas, may also be arranged on different dies. When the image sensor system 200 is monolithic the image sensor system 200 is made from a single die. More particularly the image sensor system 200 may be a monolithic CMOS sensor. However, other technologies like CCD may also be used.

The pixel area 201 comprises a first pixel area 210 comprising an array of synchronous first image sensor pixels 211. Thus, the image sensor system 200 comprises the first pixel area 210.

The synchronous first image sensor pixels 211 are operated as a frame-based sensor. For example, each first image sensor pixel 211 may comprise a photoreceptor which is coupled to a read-out circuitry (shown in FIG. 2*e* below). All first image sensor pixels 211 may be read synchronously with respect to a timing of a shutter.

In some embodiments herein the first image sensor pixels 211 are sensitive to electromagnetic irradiation within a wavelength span visible to humans, such as 380-800 nm. However, in some other embodiments the first image sensor pixels 211 are sensitive to electromagnetic irradiation within a wavelength span which is not visible to humans, such as an IR wavelength span, particularly within mid-wavelength infrared and/or long-wavelength infrared.

The pixel area 201, and thus the image sensor system 200, further comprises an infrared pixel area 240 comprising infrared image sensor pixels 241, 242 sensitive to infrared irradiation. An IR camera may also be referred to as a thermal camera. The infrared image sensor pixels 241, 242 may be sensitive to infrared radiation within mid-wavelength infrared and/or long-wavelength infrared, such as within a wavelength span 1000 nm to 14000 nm, specifically within a wavelength span 5000 nm to 12000 nm, more specifically to a wavelength span 6000 nm to 8000 nm.

The pixel area 201 may further comprise a second pixel area 220 comprising hybrid second image sensor pixels 221, 222. As mentioned above in relation to FIG. 1, a hybrid pixel, such as each of the hybrid second image sensor pixels 221, 222, although being a single pixel, may be defined as a combination of an active, or in other words a synchronous pixel, and an event-based pixel, or in other words an asynchronous pixel. The hybrid second image sensor pixels 221, 222 combine a single electromagnetic receptor with two different types of read-out circuits (further described below in relation to FIG. 2*g*). Which type of read-out circuit that is to be used is controllable. Thus, the second image sensor pixels 221, 222 may operate in two modes.

The second pixel area 220 may further comprise third image sensor pixels 223 which are pure synchronous pixels, that is, they only operate by being synchronously read by a synchronous read-out circuit.

The image sensor system 200 further comprises a change detector area 230 comprising multiple asynchronous change detectors 231, 232. The change detector area 230 may comprise first asynchronous change detectors 231 and second asynchronous change detectors 232.

The first asynchronous change detectors 231 are electrically coupled to the infrared image sensor pixels 241, 242. Thus, detection of infrared radiation with the infrared image sensor pixels 241, 242 is event-based, or asynchronous.

The second asynchronous change detectors 232 may be electrically coupled to the hybrid second image sensor pixel 221, 222. For example, each second asynchronous change detector 232 may be connected to a corresponding hybrid second image sensor pixels 221, 222.

The change detector area 230 is distinct from the pixel area 201. That is, the change detector area 230 is a distinct part of the image sensor system 200 which is separate from the pixel area 201. Thus, the change detector area 230 is separated from the hybrid second image sensor pixels 221, 222 as well from the infrared image sensor pixels 241, 242. In other words, the pixel area 201 does not comprise any change detectors 231, 232.

In embodiments herein when two areas are said to be separate that means that the two areas are not overlapping in the same plane. Thus, if the two separate areas are arranged on the same plane the areas are non-overlapping. If the two areas are arranged on different planes of the image sensor system 200 then the two areas may be arranged above/below each other and still be separate.

In some embodiments the change detector area 230 is arranged outside the pixel area 201 of the image sensor system 200. In other words, the change detector area 230 may be arranged to at least partly surround the different pixel areas 210, 220, 240.

For example, the change detector area 230 may be arranged to at least partly surround the pixel area 201. In some embodiments, e.g., as illustrated in FIG. 2*a*, the change detector area 230 is arranged to surround the first pixel area 210 and the second pixel area 220, while the infrared pixel area 240 surrounds the change detector area 230.

The layout of the image sensor system 200 that is illustrated in FIG. 2*a* where the change detector area 230 is arranged between the second pixel area 220 and the infrared pixel area 240 allows easier access to the change detectors from both the hybrid second image sensor pixels 221, 222 and from the infrared pixels 241, 242. A benefit of this layout is that there will be more time from when an object is detected by the infrared pixels 241, 242 until the object is detected in the first and second pixel areas 210, 220. As an integration time of the infrared pixels 241, 242 is longer than an integration time of the synchronous pixels 211, 223, this layout may be valuable to be able to adjust settings of the synchronous and hybrid pixels 211, 221, 222 in time.

Figure 2B:
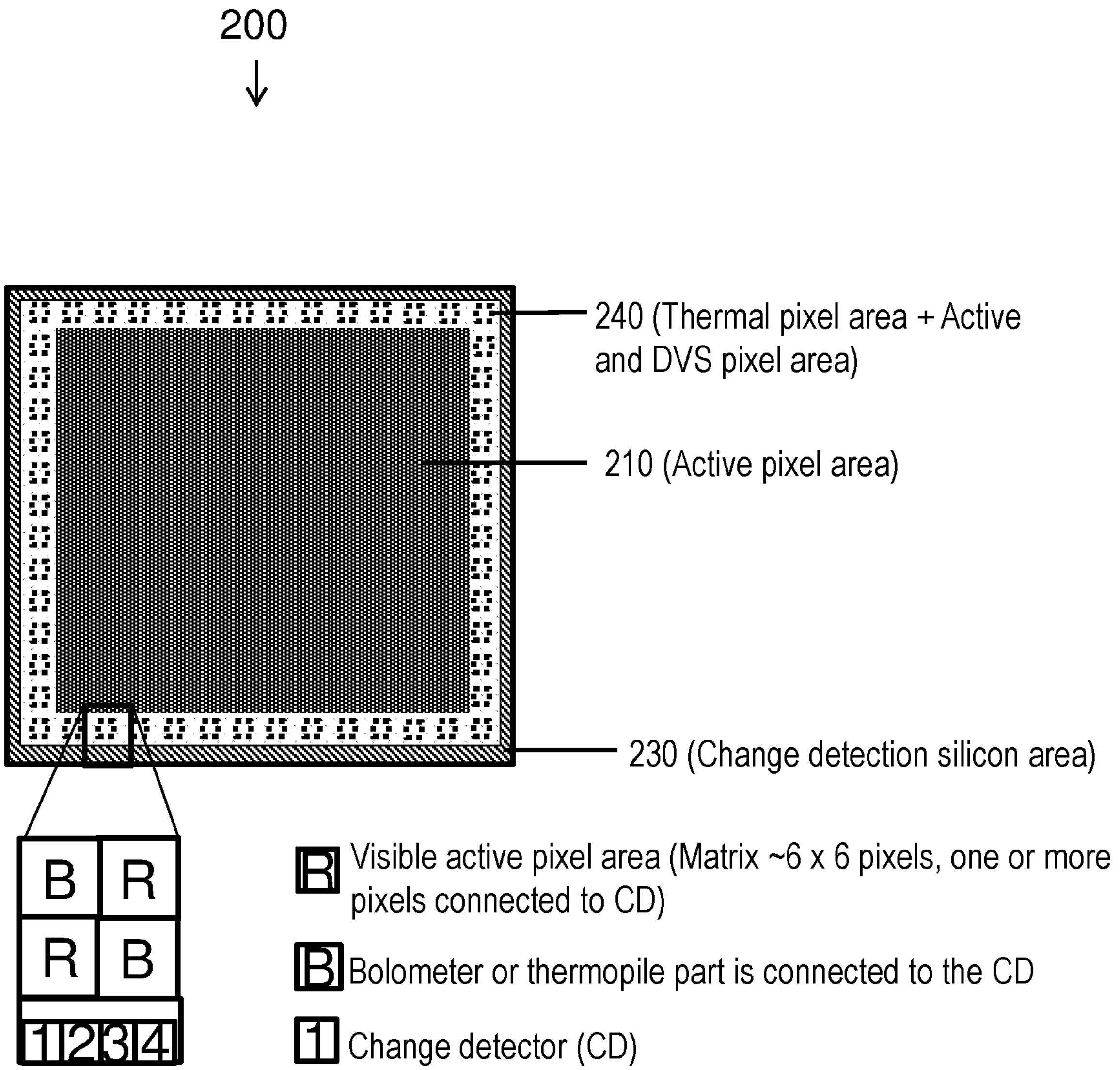
FIG. 2*b* illustrates further exemplifying embodiments of an image sensor system.

In another example, illustrated in FIG. 2*b*, the change detector area 230 completely surrounds the pixel area 201. In another example the change detector area 230 is arranged to partly surround the pixel area 201, or parts of the pixel area 201, such as the first pixel area 210 and the second pixel area 220, e.g., by being arranged in a U-shape around the pixel area 201 or parts of the pixel area 201.

In other words, the change detector area 230 may be arranged outside an active area, or in other words a light sensitive area, of the image sensor system 200. For example, in some embodiments herein the change detector area 230 is arranged on the image sensor system 200 such that no light from the scene hits the change detector area 230.

In some embodiments herein the respective first and second pixel areas 210, 220 may comprise multiple pixel areas.

The second pixel area 220 may be a distinct part of the image sensor system 200. Thus, the second pixel area 220 may be separate from the first pixel area 210. However, in some embodiments the first and second pixel areas 210, 220 may overlap.

In some embodiments herein the second pixel area 220 is arranged to at least partly surround the first pixel area 210. Then the first pixel area 210 may be arranged in the centre of the pixel area 201.

In some embodiments the second pixel area 220 is at least partly arranged in the centre of the pixel area 201.

Although not shown in FIG. 2*a*, the infrared pixel area 240 may also comprise hybrid image sensor pixels. FIG. 2*b* illustrates embodiments wherein the infrared pixel area 240 also comprise synchronous image sensor pixels and/or hybrid image sensor pixels. In other words, in FIG. 2*b* the infrared pixel area 240 comprises a thermal pixel area and an active and DVS pixel area. In FIG. 2*b* the infrared pixel area 240 surrounds the first pixel area 210 comprising the array of synchronous first image sensor pixels 211.

Since the infrared pixels may be much larger than the synchronous image sensor pixels and/or hybrid image sensor pixels there may be more than one synchronous image sensor pixel and/or hybrid image sensor pixel per infrared pixel 241, 242.

For example, a matrix of 6×6 normal CMOS sensor pixels may occupy the same area as one infrared pixel 241, 242, since the normal CMOS sensor pixel pitch may be 1.4 um while the pixel pitch of the infrared pixels may be 8.4 um. In another example a matrix of 12×12 normal CMOS sensor pixels may occupy the same area as one infrared pixel 241, 242, since the normal CMOS sensor pixel pitch may be 1 um while the pixel pitch of the infrared pixels may be 12 um.

By arranging the first pixel area 210 with the synchronous first image sensor pixels 211 in the centre of the image sensor system 200 it is possible to obtain a high-resolution synchronous image although the second hybrid image sensor pixels 221, 222 and even more the infrared image sensor pixels 241, 242 are bigger.

As illustrated in FIG. 2*a* and FIG. 2*b*, the pixel area 201 may be of a rectangular shape. In particular, the first pixel area 210 and the second pixel area 220 may both be of rectangular shape or be built up by smaller sub areas which are of rectangular shape. However, other shapes of the pixel areas 210, 220, 240 are also possible. In more detail the second pixel area 220 of FIG. 2*a* is illustrated as a frame of rectangular shape around the first pixel area 210, which is illustrated as a rectangle. The first pixel area 210 may be arranged centrally on the image sensor system 200. The second pixel area 220 may be arranged concentrically around the first pixel area 210.

In some embodiments herein the infrared pixel area 240 is arranged to at least partly surround the first pixel area 210 or to at least partly surround the first pixel area 210 and the second pixel area 220.

The array of synchronous first image sensor pixels 211 comprises multiple first image sensor pixels 211. The first image sensor pixels 211 may for example be arranged in rows and columns. Also the infrared image sensor pixels 241, 242 may be arranged in rows and columns as illustrated in FIG. 2*a*. For example, the infrared image sensor pixels 241, 242 may be arranged in at least two rows or columns.

Finally, the second image sensor pixels 221, 222 may also be arranged in rows and columns.

In some embodiments a first pixel density of the first pixel area 210 equals a second pixel density of the second pixel area 220. In other words, the amount of pixels that fit in a specific area may be the same for the first and second pixel areas 210, 220. Thus, the pixel pitch may be the same for the first and second pixel areas 210, 220. As a result of arranging the pixels in the first and second pixel areas with the same density and/or the same pitch the resolution for the two pixel areas may be the same.

In some embodiments the size of the pixels may be the same.

However, the pixel density, pixel pitch and pixel size may also be different for the first and second pixel areas 210, 220.

The pixels 211, 221, 222, 223, 241, 242 are the smallest addressable elements of the image sensor system 200. Also the pixels are illustrated as rectangular. However, other shapes of the pixels are possible. The first pixel area 210 and the second pixel area 220 may be arranged on the same plane of the A, e.g. on the same surface.

In order for the second image sensor pixels 221, 222 to contribute to the synchronous image a respective second image sensor pixel 221, 222 may be provided with a color filter. In order to optimise sensitivity to visible light the respective second image sensor pixel 221, 222 may comprise a green color filter since pixels with a green color filter contribute with more luminance than pixels with red or blue color filters. In some other embodiments the sensitivity to the electromagnetic radiation to be detected may be increased by not arranging any color filter in or in front of the respective hybrid second image sensor pixel 221, 222. Thus, in some embodiments the respective hybrid second image sensor pixel 221, 222 does not comprise a color filter. If all or some of the hybrid second image sensor pixels 221, 222 correspond to green pixels with removed color filter a green value for those pixels may be calculated. The green value may for example be calculated by periodically capturing a full frame image from at least the first pixel area 210. The calculation may be performed in numerous ways and is commonly used in imaging as each pixel only has one color filter, and intensity values of the other two colors are calculated, e.g. by using known relations between sensitivity and wavelength.

In another embodiment the respective second image sensor pixel 221, 222 have another color filter characteristic such as red, blue or any other wavelength depending on the use of the second image sensor pixels 221, 222, to be able to detect a certain wavelength of the objects that are to be detected by the second image sensor pixels 221, 222.

In some embodiments the respective second image sensor pixel 221, 222 comprises two or more different color filters to be able to detect combinations of different wavelengths.

The image sensor system 200 further comprises a synchronous intensity read-out circuitry 260. The synchronous intensity read-out circuitry 260 is configured for synchronous read-out of a pixel intensity. The synchronous intensity read-out circuitry 260 may be arranged outside the pixel area 201. In other words, the synchronous intensity read-out circuitry 260 may be arranged on a part of the image sensor system 200 which is separate from the pixel area 201, e.g., which does not overlap the pixel area 201. The synchronous intensity read-out circuitry 260 may comprise multiple synchronous intensity read-out circuitries 260. Then a respective synchronous intensity read-out circuitry 260 may be arranged at the end of a column of pixels. In other embodiments a single synchronous intensity read-out circuitry 260 may be connected to multiple pixel columns via a multiplexer. In some embodiments herein the synchronous intensity read-out circuitry 260 comprises the multiplexer. In some further embodiments the synchronous intensity read-out circuitry 260 may also comprise an analog front-end and/or an analog-to-digital converter (ADC).

As mentioned above, FIG. 2*a* illustrates the second pixel area 220 as a frame around the first pixel area 210. This arrangement makes it possible to provide a high resolution first pixel area 210, i.e., it is possible to provide a high-resolution synchronous image frame from the first pixel area 210.

Figure 2C:
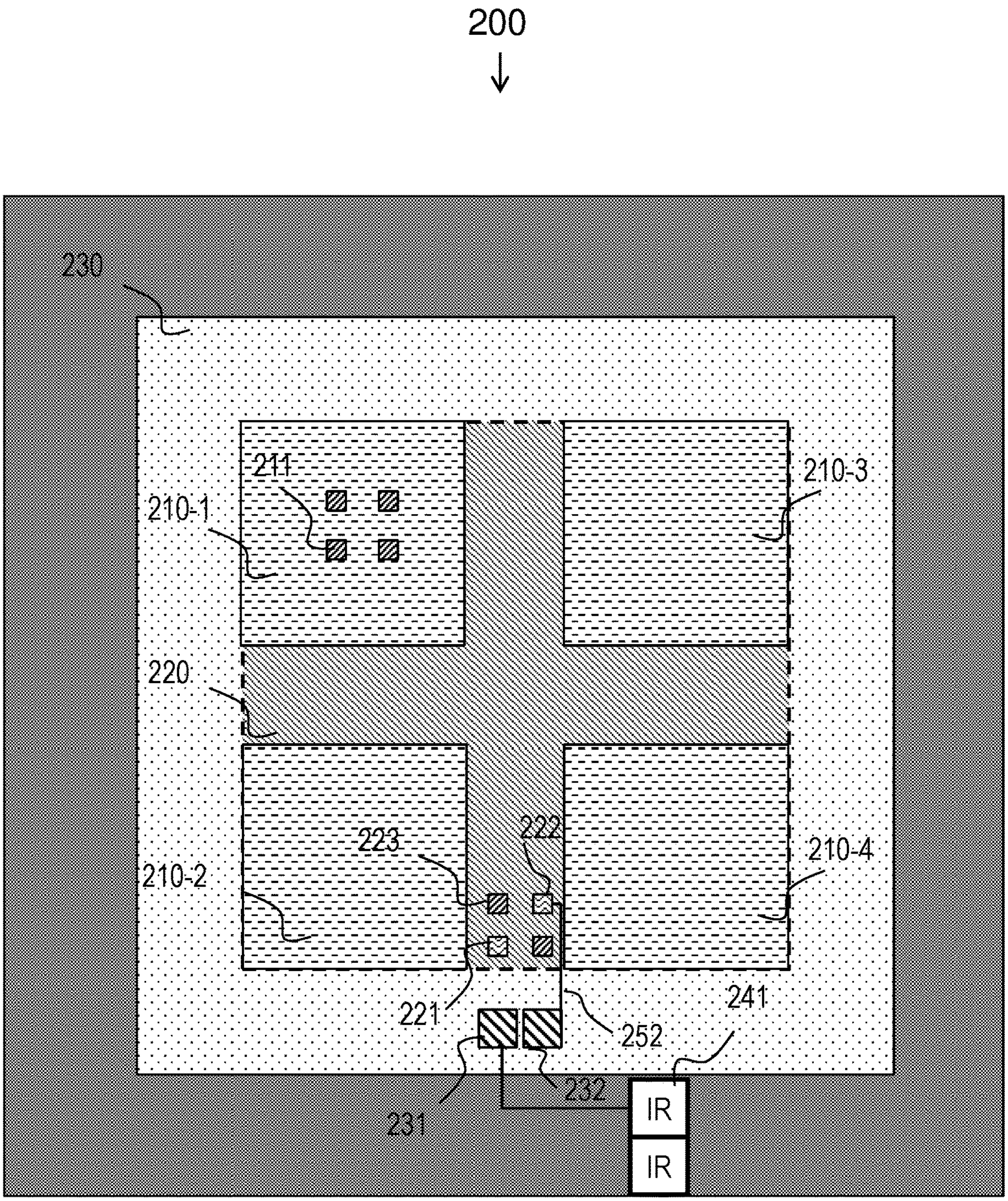
FIG. 2*c* illustrates further exemplifying embodiments of an image sensor system.

Other layouts or arrangements of the different areas of the image sensor are also possible and may depend on what the image sensor system 200 will be used for. FIG. 2*c* illustrates another layout of the different areas, still arranged on the same plane of the image sensor system 200. In FIG. 2*c* the second pixel area 220 is cross-shaped and arranged in the centre of the pixel area 201. In FIG. 2*c* the first pixel area 210 comprises four sub areas 210-1, 210-2, 210-3, 210-4. The sub areas 210-1, 210-2, 210-3, 210-4 are separated by the second pixel area 220. The change detector area 230 may be arranged in the same way as for the layout illustrated in FIG. 2*a*, e.g., around or partly around the pixel area 201.

Figure 2D:
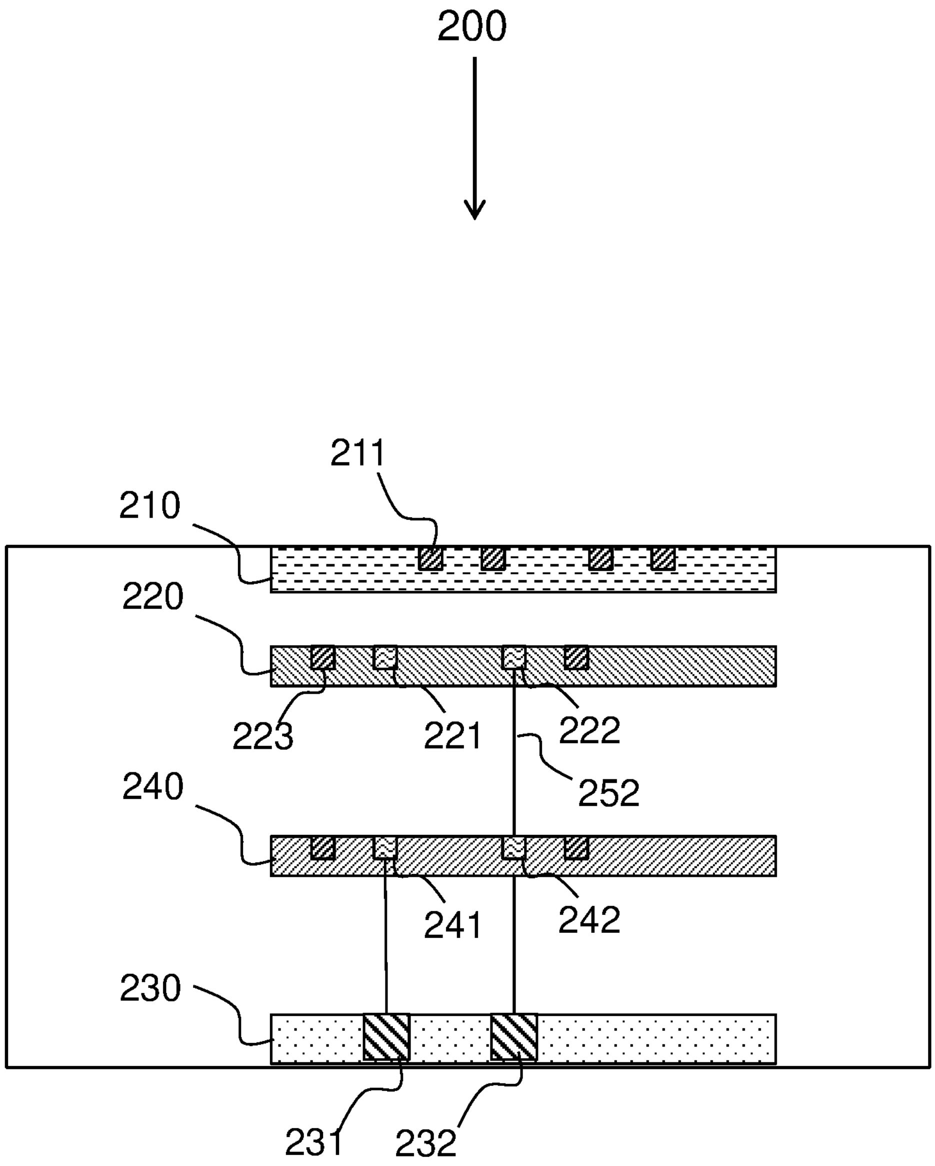
FIG. 2*d* illustrates further exemplifying embodiments of an image sensor system.

Some embodiments where the different areas of the image sensor system 200 are arranged on different planes of the image sensor system 200 will now be described with reference to FIG. 2*d*. FIG. 2*d* illustrates a cross-section of the image sensor system 200. In FIG. 2*d* the first pixel area 210 is arranged on a first plane of the image sensor system 200. In some embodiments the image sensor system 200 is to be arranged in a camera module such that the first plane is arranged more or less perpendicular to the optical axis of the camera module. The first plane may be a backside surface of the image sensor die, e.g., if the image sensor uses or takes advantage of backside illumination (BSI) technology. In other embodiments the first plane may be a frontside surface of the image sensor die.

The second pixel area 220 may be arranged on a second plane of the image sensor system 200. The second plane may for example be arranged beneath the first plane when viewed from the surface of the image sensor system 200. The change detector area 230 may be arranged on a third plane of the image sensor system 200, e.g., arranged beneath the second plane when viewed from the surface of the image sensor system 200 or between the first plane and the second plane. FIG. 2*d* further illustrates a second electrical connection 252 between one of the second image sensor pixels 222 and the second asynchronous change detector 232.

A combination of the different arrangements described above is also possible. For example, in some embodiments two of the three different areas of the image sensor system 200 are arranged on a same plane of the image sensor system 200 while one area is arranged on a different plane of the image sensor system 200.

Figure 2E:
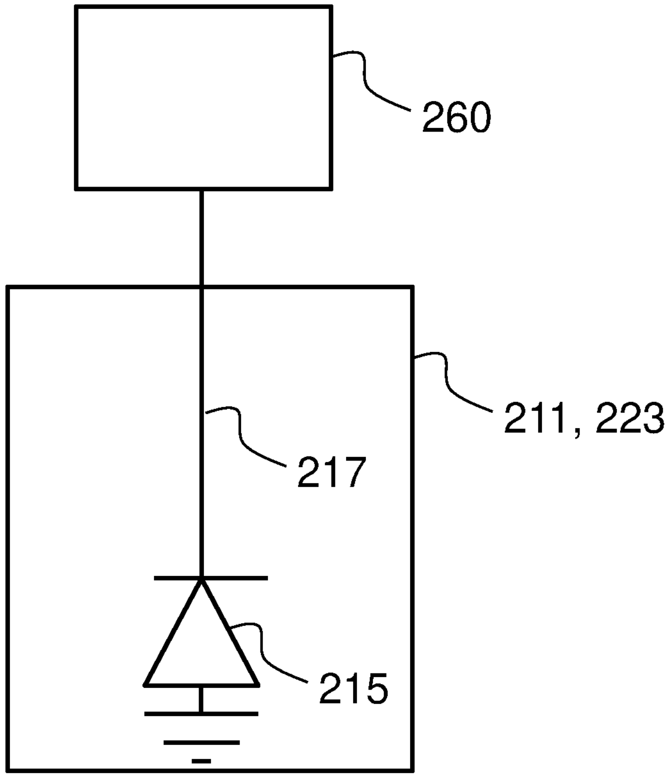
FIG. 2*e* illustrates exemplifying embodiments of a synchronous pixel of an image sensor system.

FIG. 2*e* schematically illustrates one of the synchronous first image sensor pixels 211 and an electrical connection 217 to the synchronous intensity read-out circuitry 260. Each first image sensor pixel 211 comprises a first photoreceptor 215. The first photoreceptor 215 of the respective first image sensor pixel 211, is electrically coupled to the synchronous intensity read-out circuitry 260. FIG. 2*e* illustrates the electrical connection 217 between the first photoreceptor 215 of the first image sensor pixel 211 and the synchronous intensity read-out circuitry 260.

Figure 2F:
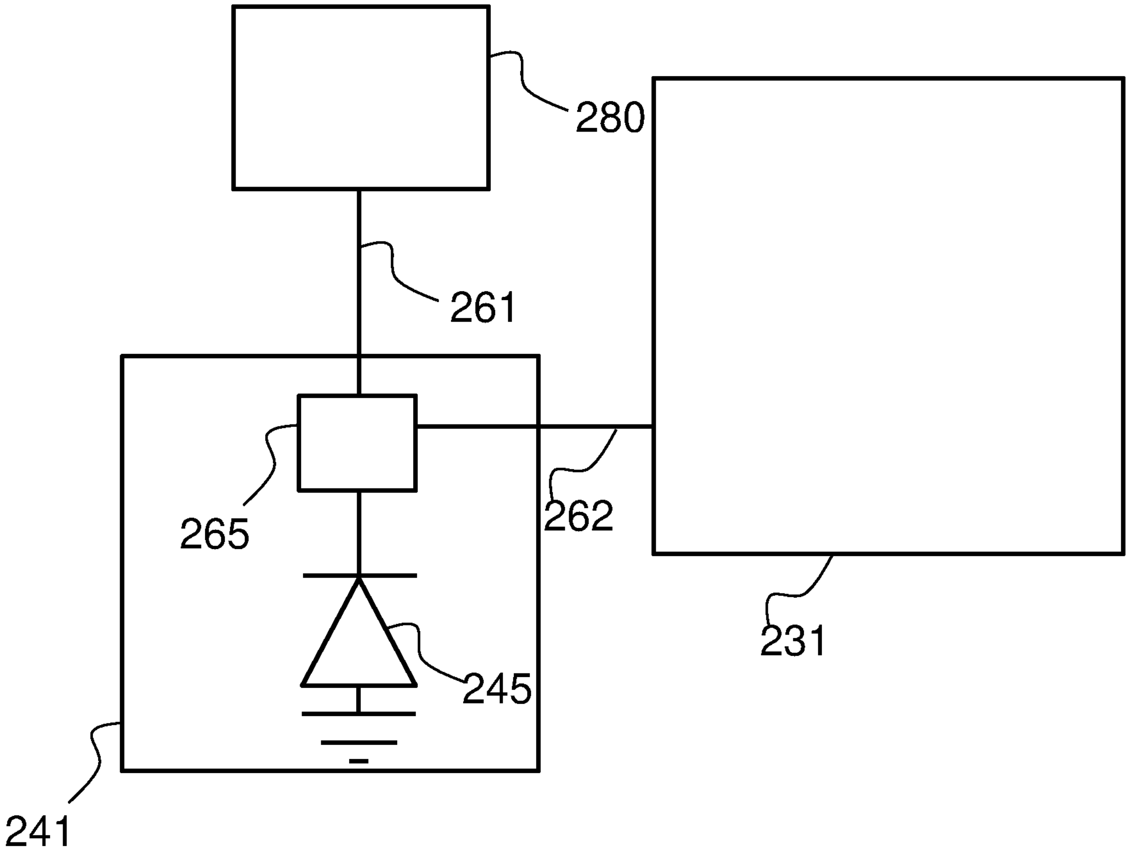
FIG. 2*f* illustrates exemplifying embodiments of an infrared pixel of an image sensor system.

FIG. 2*f* schematically illustrates a first infrared image sensor pixel 241 of the infrared image sensor pixels 241, 242. Each infrared image sensor pixel 241, 242 comprises a detector sensitive to infrared irradiation. The detector will be referred to as an infrared detector 245. The infrared detector 245 of a respective infrared image sensor pixel 241, 242 is electrically coupled to a respective first asynchronous change detector 231 out of the multiple asynchronous change detectors 231, 232. FIG. 2*f* further illustrates an electrical connection 262 between the infrared detector 245 and the asynchronous change detector 231. The electrical connection 262 may be a direct connection.

The infrared detector 245 of the respective infrared image sensor pixel 241, 242 may be based on: a bolometer, a thermopile, an infrared photoreceptor, or Microelectromechanical Systems (MEMS). In FIG. 2*f* the infrared detector 245 is exemplified with an infrared photoreceptor.

The infrared image sensor pixels 241, 242 may be sensitive to infrared irradiation within mid-wavelength infrared and/or long-wavelength infrared, such as within a wavelength span 1000 nm to 14000 nm, specifically within a wavelength span 5000 nm to 14000 nm, more specifically to a wavelength span 7000 nm to 12000 nm.

The infrared image sensor pixels 241, 242 may further be connected with a further electrical connection 261 to a second synchronous intensity read-out circuitry 280. Then the infrared image sensor pixels 241, 242 may further comprise an electrical splitter 265 in order to connect the infrared detector 245 to both the second synchronous intensity read-out circuitry 280 and the change detector 231. In some embodiments the second synchronous intensity read-out circuitry 280 is the same synchronous intensity read-out circuitry as the first synchronous intensity read-out circuitry 260.

In some embodiments the infrared pixel area 240 further comprises the second pixel area 220. For example, the infrared pixel area 240 may comprise the hybrid image sensor pixels 221, 222.

The infrared pixel area 240 may further comprise synchronous image sensor pixels (corresponding to the synchronous first image sensor pixels 211 or the third image sensor pixels 223 of FIG. 2*e*) which are not coupled to the change detectors. An infrared detector 245, e.g., corresponding to the synchronous photoreceptor 215 in FIG. 2*e*, of a respective synchronous image sensor pixel of the infrared pixel area 240 is electrically coupled to the second synchronous intensity read-out circuitry 280 but not electrically coupled to the asynchronous change detectors 231, 232. The synchronous image sensor pixels of the infrared pixel area 240 may be of a same type as the first image sensor pixels 211 and/or of the same size.

In different embodiments the relative amount of synchronous and/or hybrid image sensor pixels to infrared image sensor pixels 241, 242 in the infrared pixel area 240 may vary. However, as mentioned above in relation to FIG. 2*b*, the pitch of the synchronous and/or hybrid image sensor pixels may be smaller than the pitch of the infrared image sensor pixels 241, 242 as the former pixels may be smaller.

The spatial resolution of the asynchronous event detection may be improved if the infrared image sensor pixels 241, 242 are arranged in at least two rows or columns compared to if the infrared image sensor pixels 241, 242 are arranged in a single row or column.

The rows or columns do not need to be adjacent to each other. In some embodiments there are several rows and/or columns of synchronous and/or hybrid second image sensor pixels in-between each infrared image sensor pixels 241, 242. Such an arrangement may provide a better angular resolution of an object captured by the image sensor system 200.

Figure 2G:
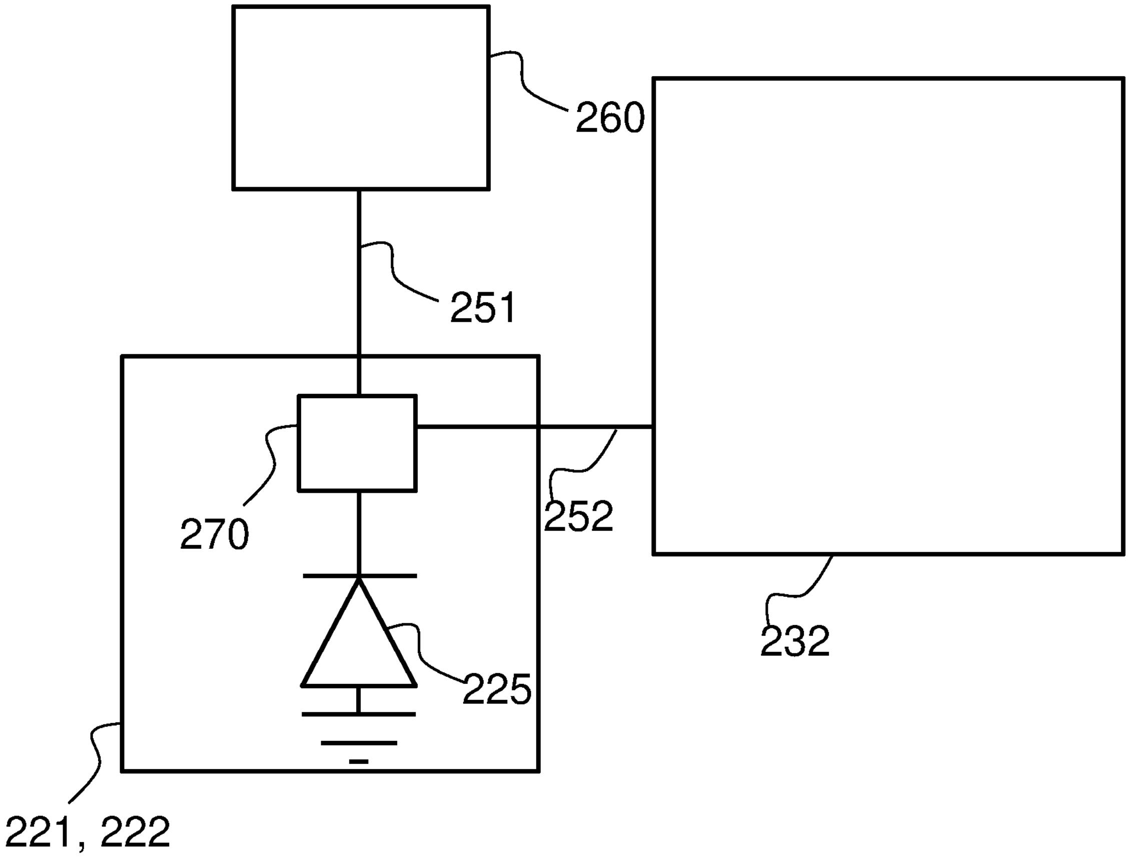
FIG. 2*g* illustrates exemplifying embodiments of a hybrid pixel of an image sensor system.

FIG. 2*g* schematically illustrates one of the hybrid second image sensor pixels 221, 222 and a first electrical connection 251 to the synchronous intensity read-out circuitry 260. Each hybrid second image sensor pixel 221, 222 comprises a photoreceptor which will be referred to as a second photoreceptor 225 mentioned above. The second electromagnetic receptor 225 of a respective hybrid second image sensor pixel 221, 222 may be electrically coupled to the synchronous intensity read-out circuitry 260 and electrically coupled to a respective second asynchronous change detector 232 out of the multiple asynchronous change detectors 231, 232. The second image sensor pixels 221, 222 may further comprise an electrical splitter 270 in order to connect the second photoreceptor 225 to both the synchronous intensity read-out circuitry 260 and the change detector 231, 232.

As mentioned above, the second pixel area 220 may further comprise the third image sensor pixels 223. FIG. 2*e* also schematically illustrates one of the third image sensor pixels 223. A third photoreceptor of a respective third image sensor pixel 223 is electrically coupled to the synchronous intensity read-out circuitry 260 but not electrically coupled to the asynchronous change detectors 231, 232. The third image sensor pixels 223 may be of a same type as the first image sensor pixels 211 and/or of the same size.

In different embodiments the relative amount of third image sensor pixels 223 to second image sensor pixels 221, 222 may vary. However, the third image sensor pixels 223 may be arranged within the second pixel area 220 such that the overall pixel pitch in the second pixel area 220 is the same.

In some embodiments the second pixel area 220 comprises at least two rows and two columns of second image sensor pixels 221, 222. That is, the second image sensor pixels 221, 222 may be arranged in at least two rows or columns. The spatial resolution of the asynchronous event detection may be improved if the second image sensor pixels 221, 222 are arranged in at least two rows or columns compared to if the second image sensor pixels 221, 222 are arranged in a single row or column.

The rows or columns do not need to be adjacent to each other. In some embodiments there are several rows and/or columns of third image sensor pixels 223 in-between each second image sensor pixels 221, 222. Such an arrangement may provide a better angular resolution of an object captured by the image sensor system 200.

The photoreceptors 225 of the second image sensor pixels 221, 222 may also be of a same type as the first photoreceptor 215 of the synchronous first image sensor pixels 211 and/or of a same type as the photoreceptor of the third image sensor pixel 223.

In some embodiments the photoreceptors 225 of the second image sensor pixels 221, 222 may have a same size as the first photoreceptor 215 of the synchronous first image sensor pixels 211 and/or the same size as the photoreceptor of the third image sensor pixel 223.

The second photoreceptor 225 of the respective hybrid second image sensor pixel 221, 222 is electrically coupled to the synchronous intensity read-out circuitry 260 with the first electrical connection 251 and electrically coupled to a respective asynchronous change detector 232 out of the multiple asynchronous change detectors 231, 232 with the second electrical connection 252.

FIG. 2*g* illustrates the first electrical connection 251 between the second photoreceptor 225 and the synchronous intensity read-out circuitry 260. FIG. 2*g* further illustrates the second electrical connection 252 between the second photoreceptor 225 and the second asynchronous change detector 232.

The second image sensor pixels 221, 222 of the second pixel area 220 may be used together with the first image sensor pixels 211 to build a synchronous image from the pixel area 201.

In some embodiments herein the image sensor system 200 is configured to operate the second image sensor pixels 221, 222 either in an asynchronous mode, in which the respective asynchronous change detector 232 asynchronously outputs a signal if a significant change in illumination intensity at the corresponding photoreceptor 225 is detected, or in a synchronous mode, in which the synchronous intensity read-out circuitry 260 synchronously outputs a respective pixel value corresponding to a respective illumination intensity of the corresponding photoreceptor 225.

In some further embodiments herein the image sensor system 200 is configured to operate the infrared image sensor pixels 241, 242 either in an asynchronous mode, in which the respective first asynchronous change detector 231 asynchronously outputs a signal if a significant change in electromagnetic intensity at the corresponding electromagnetic detector 245 is detected, or in a synchronous mode, in which the synchronous intensity read-out circuitry 280 synchronously outputs a respective pixel value corresponding to a respective electromagnetic intensity of the corresponding electromagnetic detector 245.

Example embodiments of how the image sensor system 200 may be operated will be described below.

Embodiments herein will now described with reference to FIG. 3*a* which illustrate a camera module 300 comprising the image sensor system 200 described above.

The camera module 300 will first be described on a high level and then on a more detailed level describing the parts separately. The camera module 300 may comprise a change detector system that collects events from the change detectors 231, 232 whether they are from the infrared pixels 241, 242 or from the hybrid second pixels 221-222. A digital processing block is available to determine if the information from the change detector system should trigger an image sensor control change that may be for example starting all the photosensitive pixels to be able to take a snapshot or a sequence of images, but also what sensor characteristics that is needed such as integration time, gain, white balance, thermal range etc.

The digital processing block may also send a trigger to a host device so the host device may prepare to receive information from the camera module 300 if needed and in some cases do post processing on that data to determine if other changes need to be done to the settings or if the information provided is fine for the application it is meant to solve.

Figure 3A:
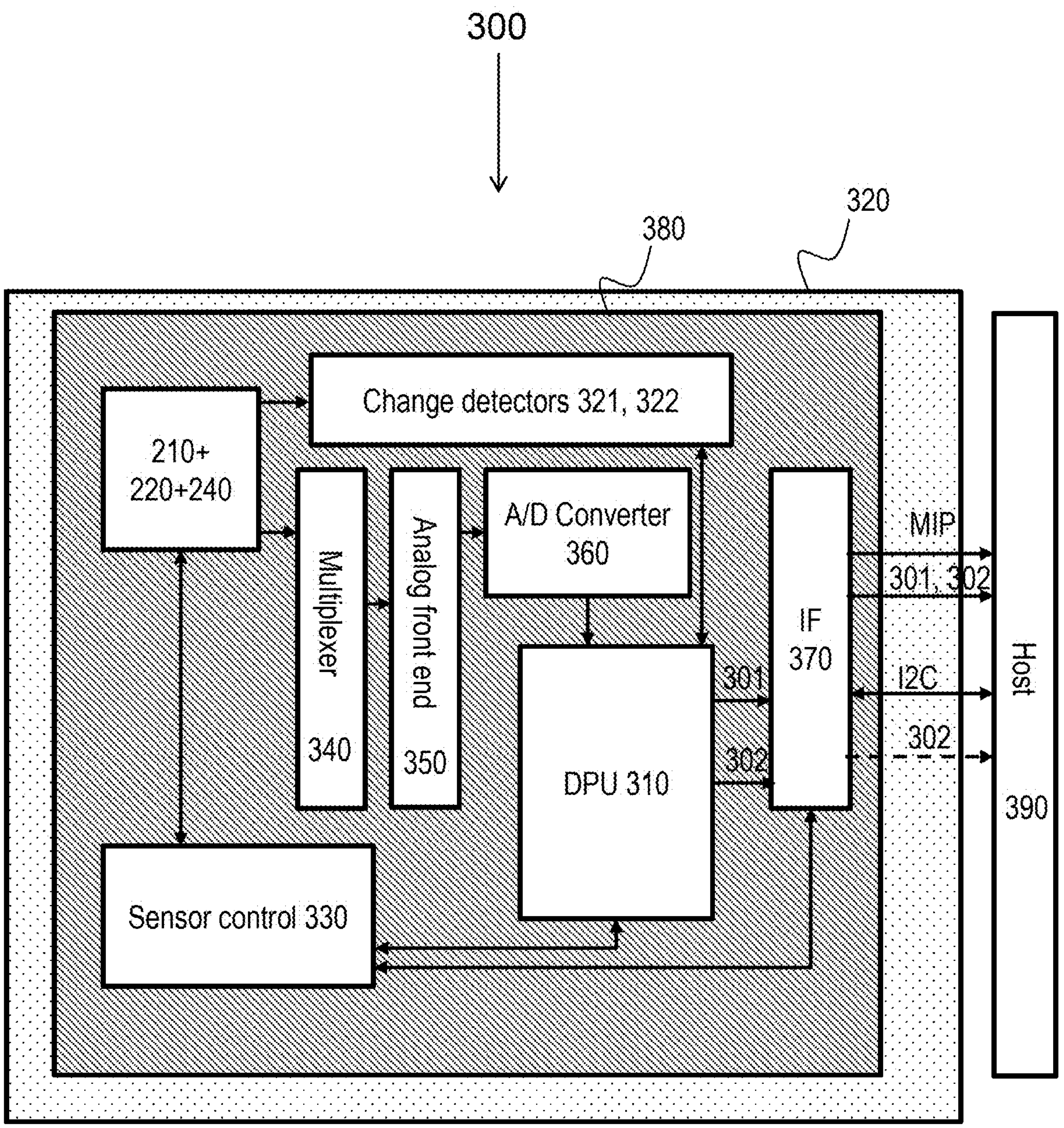
FIG. 3*a* illustrates exemplifying embodiments of a camera module comprising a monolithic image sensor system.

As mentioned above the image sensor system 200 may be monolithically integrated on the same die 380, which is illustrated in FIG. 3*a*.

The camera module 300 may comprise a Digital Processing Unit, DPU, 310 configured to determine a setting of the image sensor system 200 based on output from the asynchronous change detectors 231, 232 comprised in the image sensor system 200, and control the image sensor system 200 by implementing the setting.

For example, the DPU 310 may be configured to determine the setting of the image sensor system 200 based on output from the infrared image sensor pixels 241, 242.

In some embodiments the DPU 310 and the image sensor system 200 are monolithically integrated. That is, the DPU 310 and the image sensor system 200 may be arranged on a same die 380, as illustrated in FIG. 3*a*. Also one or more of the further parts of the camera module 300, which will be described below, may be integrated with the image sensor system 200. Thus, as shown in FIG. 3*a*, the entire camera module 300 may be monolithically integrated on the same die 380.

As mentioned above, the image sensor system 200 comprises the multiple asynchronous change detectors 231, 232. Thus, the camera module 300 also comprises the multiple asynchronous change detectors 231, 232. In FIG. 3*a*, the multiple asynchronous change detectors 231, 232 have been depicted as a separate part of the camera module 300, although they in fact are integrated with the image sensor system 200, in order to better understand the different flows of data and control signals within the camera module 300.

The camera module 300 may further comprise a sensor control 330, a multiplexer 340, an analog front end 350, an ADC 360, an interface (IF) 370 to a host device 390.

As mentioned above, the synchronous intensity read-out circuitry 260 may comprise the multiplexer 340. In some further embodiments the synchronous intensity read-out circuitry 260 may also comprise the analog front-end 350 and/or the ADC 360.

The host device 390 may for example be an application host such as an image processor in a camera or in a mobile phone.

The arrows in FIG. 3*a* indicate data or communication flow. For example, the change detectors 231, 232 may receive pixel signals or pixel data from the image sensor system 200, i.e., from the hybrid second image sensor pixels 221, 222. The DPU 310 may collect data from the change detectors 231, 232. For example, the DPU 310 may query the change detector 231, 232 for the data. The DPU 310 may also control the change detectors 231, 232 with control signals.

The DPU 310 also receives image data from the image sensor system 200, e.g., high-resolution image frames, based on the output from the synchronous read-out circuitry 260. The data from the image sensor system 200 may pass through the multiplexer 340, the analog front end 350, and the A/D converter 360 before being processed by the DPU 310.

The DPU 310 may further communicate with the sensor control 330 which may implement settings of the image sensor system 200 which are determined or selected by the DPU 310. The sensor control 330 may be implemented by a register.

The sensor control 330 may further communicate with the image sensor system 200, for example to implement the settings of the image sensor system 200.

The DPU 310 may further communicate with the host device 390 through the IF 370. The DPU 310 may for example communicate both data 301 and triggering signals 302 with the host device 390. Communication between the IF 370 and the host device 390 may be performed over a high speed interface and/or a low speed interface. The high-speed interface may for example be a Mobile Industry Processor Interface (MIPI) such as a MIPI Camera Serial Interface (CSI). Example of other high-speed interfaces are Low-Voltage Differential Signaling (LVDS), enhanced LVDS (eLVDS), etc. The low-speed interface may for example be an Inter-Integrated Circuit (I2C) interface, Serial Peripheral Interface (SPI), Serial Camera Control Bus (SCCB) etc. Both data 301 and triggering signals 302 may be sent from the camera module 300 to the host device 390 on the high-speed interface. Triggering signals 302 may also be sent on the low-speed interface. If the triggering signals are sent on the high-speed interface then they need not be sent on the low-speed interface, which is why the arrow below the I2C-arrow is illustrated with a hatched line. Data 301 corresponding to synchronous image data, e.g. high-resolution images may be sent on the high-speed interface, while data 301 corresponding to asynchronous image data from the change detectors 231, 232 may be sent on the high-speed interface and also on the low-speed interface if the data rate is low enough.

The triggering signals 302 may also be communicated to the host 390 on a separate line.

The sensor control 330 may also communicate with the host device 390 through the IF 370. For example, the sensor control 330 may receive settings of the image sensor system 200 which are determined or selected by the host device 390.

The DPU 310 may handle all digital data for the image sensor system 200. The DPU 310 may start by collecting data from the change detectors 231, 232. Data may be passed through to the host 390 and/or processed inside the camera module 300. For example, data may be processed inside the camera module 300 to detect objects that pass into the field of view of the camera module 300.

In some embodiments the camera module 300 is configured to determine a characteristic of an object captured by the image sensor system 200 based on the output from the asynchronous change detectors 231, 232, and then determine the setting of the image sensor system 200 based on the characteristic. For example, the camera module 300 may be configured to determine a characteristic of an object captured by the image sensor system 200 based on the output from the infrared sensor pixels 241, 242.

The characteristic of the object may also be referred to as a change detector pattern.

In some embodiments the camera module 300 is configured to determine a first characteristic of an object captured by the image sensor system 200 based on the output from the infrared image sensor pixels 241, 242, and then based on the first characteristic of the captured object determine a second characteristic of the object captured by the image sensor system 200 based on the output from the hybrid second image sensor pixels 221, 222. Then the camera module 300 may be configured to determine the setting of the image sensor system 200 based on the second characteristic of the captured object, or based on the first and the second characteristic of the captured object.

For example the DPU 310 may detect a certain movement based on a calculation of a velocity, shape, size or position of the object. There may be trigger conditions associated with each characteristic, such as a velocity threshold. If the trigger condition is met, then the DPU 310 may trigger a certain action in response thereto. For example, the DPU 310 may prepare the camera module 300 to capture the object in high-resolution, that is with a synchronous high-resolution image captured by at least the first image sensor pixels 211 and possibly also by the second image sensor pixels 221, 22 and/or third image sensor pixels 223.

Examples of sensor settings that may be set are:

1. Power settings, such as on/off or low-power and high-power mode. The power settings may be applied to the first pixel area 210 and/or the second pixel area 220.
2. Exposure, e.g., to accommodate the speed of the object
3. White balance, e.g, to change color setting to optimize the captured image for later processing at the host 390
4. Focus, e.g., to make sure that the object is in focus, in case of an auto focus camera module. In this case the driver of the auto-focus may be part of the camera module 300. For example, the driver of the auto-focus may be arranged on a same PCB on which the camera module 300 is arranged. By employing embodiments herein the focus may be controlled by the camera module 300 instead of by the host.
5. Resolution, e.g., to optimize the captured image for later processing at the host 390.

There are several different ways to specify the change detection pattern. In one example, the DPU 310 of the camera module 300 reacts on detected movements at any infrared image sensor pixel 241, 242 or on a combination of detected movements at any infrared image sensor pixel 241, 242 and at any second image sensor pixel 221, 222 and then monitors for further changes on the same and neighboring pixels.

By monitoring more than one change, the DPU 310 may filter out individual transients. The DPU 310 may be set to trigger activation of the high-resolution image sensor system 200 according to a few different schemes, all controlled by the DPU 310 and settings of the camera module 300, for example settings of the image sensor system 200. This mechanism exploits the fact that the infrared image sensor pixels 241, 242 and the hybrid second image sensor pixels 221, 222 have a much higher activation rate than the fastest frame rate of the image sensor system 200 in the high-resolution synchronous mode. For example:

By detecting multiple events with the change detectors 231, 232. For example, if a consistent change of multiple activations of the change detectors 231, 232 occurs, a series of high-resolution sensor frames may be captured. It may be sufficient that there is a consistent activation across neighboring infrared image sensor pixels 241, 242 and/or second image sensor pixels 221, 222, e.g., first an outer infrared pixel 241 followed by a neighboring inner infrared pixel 242. The consistent change of multiple activations may correspond to a situation where many change detectors 231, 232 are being triggered constantly. E.g., the camera module 300 itself is on the move, which may mean that the user intends to capture a video sequence. As opposed to a situation where just a few change detectors 231, 232 were activated on an upper-left corner of the pixel area 201, which may mean that the user wants to take a single shot to see what happened. The settings of the camera module 300 may dictate whether a single camera shot shall be captured or a video sequence.

By estimating a speed at which the infrared image sensor pixels 241, 242 and/or the second image sensor pixels 221, 222 trigger changes. This may be done by measuring a difference time between the triggered signal changes of the change detectors 231, 232 and relating the time difference to the distance between the infrared image sensor pixels 241, 242 and/or the second image sensor pixels 221, 222 that gave rise to the signal changes.

By estimating a future position of the object. For example, in case of automatic single shot setting, the DPU 310 may calculate when the moving object will reach a position in the image frame which maximizes its visibility in the field-of-view (FOV). Then the DPU 310 may trigger the sensor control 330 to capture a high-resolution image in the synchronous operating mode at the calculated time. This may be done as follows:

If the change detectors 231, 232 continuously trigger on movements at the object's entry-point into the FOV, without interruption, the high-resolution image capture may occur when the initial part of the object is estimated to have reached for example 80% into the FOV.

If the change detectors 231, 232 indicate that the movements at the entry point stops before the above position, the high-resolution image frame is triggered when the object is calculated to be in the middle of the FOV.

If, because of miscalculation of speed, further change detectors 231, 232 connected to further infrared image sensor pixels 241, 242 and/or hybrid second image sensor pixels 221, 222 indicate an outgoing movement (light intensity of inner second pixel is changed before light intensity of an outer second pixel is changed), the camera module 300 may immediately capture a high-resolution image.

The above embodiments may be combined. Further optimizations are possible, e.g., enabling capturing of cropped high-resolution image fames if it is estimated that the object is only visible at a certain subset of the pixel area 201 of the image sensor system 200.

One important aspect of embodiments herein is that data from the change detectors 231, 232 do not need to travel to the host 390 and then back to be able to set the parameters for the high-resolution sensor, e.g., for the first pixel area 210 and possibly for the second pixel area 220. This means that there will be very low latency from object detection to a sensor ready to capture a high-resolution image of that object. This is not possible if the change detectors need to wake up the host 390, that needs to process the information and then send parameter settings to the high-resolution sensor. Thus, it is an advantage that the camera module 300 according to embodiments herein may work stand alone in a really low-power mode without any interaction with the host 390.

As mentioned above, the image sensor system 200 may be configured to operate the second image sensor pixels 221, 222 either in an asynchronous mode or in a synchronous mode. Also the camera module 300 may be configured to operate in an asynchronous operating mode or a synchronous operating mode. In the asynchronous operating mode the camera module 300 reads output from the change detectors 231, 232, e.g., from the first asynchronous change detectors 231. In the synchronous operating mode the camera module 300 reads output from the synchronous intensity read-out circuitry 260. Further, the camera module 300 may be configured to change operating mode from the asynchronous operating mode to the synchronous operating mode and back again. More particularly, the camera module 300 may be configured to change operating mode from the asynchronous operating mode to the synchronous operating mode based on the output from the change detectors 231, 232. For example, the camera module 300 may be configured to operate the camera module 300 in the asynchronous operating mode in which the camera module 300 reads output from the first asynchronous change detectors 231, and control the image sensor system 200 by implementing the setting by being configured to change operating mode from the asynchronous operating mode to the synchronous operating mode, in which the camera module 300 reads output from the synchronous intensity read-out circuitry 260, based on the output from the first asynchronous change detectors 231.

In some other embodiments the camera module 300 is further configured to capture, in the synchronous operating mode, a synchronous image frame based on the output from the synchronous intensity read-out circuitry 260, transmit the image to the host device 390 and/or discard the image, and change operating mode from the synchronous operating mode to the asynchronous operating mode in response to transmitting or discarding the image.

In some embodiments the output from the asynchronous change detectors 231, 232 comprises a first output associated with a first infrared image sensor pixel 241 or a first hybrid pixel 221 followed by a second output from a neighbouring infrared image sensor pixels 242 or neighbouring hybrid pixel 222. Then the camera module 300 may be further configured to capture multiple synchronous image frames with the synchronous intensity read-out circuitry 260 in response to detecting the output from the asynchronous change detectors 231, 232.

The camera module 300 may further comprise a single lens system for both the first pixel area 210 and the infrared pixel area 240. This reduces the cost and the complexity for the camera module 300 compared to a camera module with two separate lens systems for the first pixel area 210 and the infrared pixel area 240.

The camera module 300 may further comprise a printed circuit board 320 onto which the different parts of the camera module 300 may be mounted.

Figure 3B:
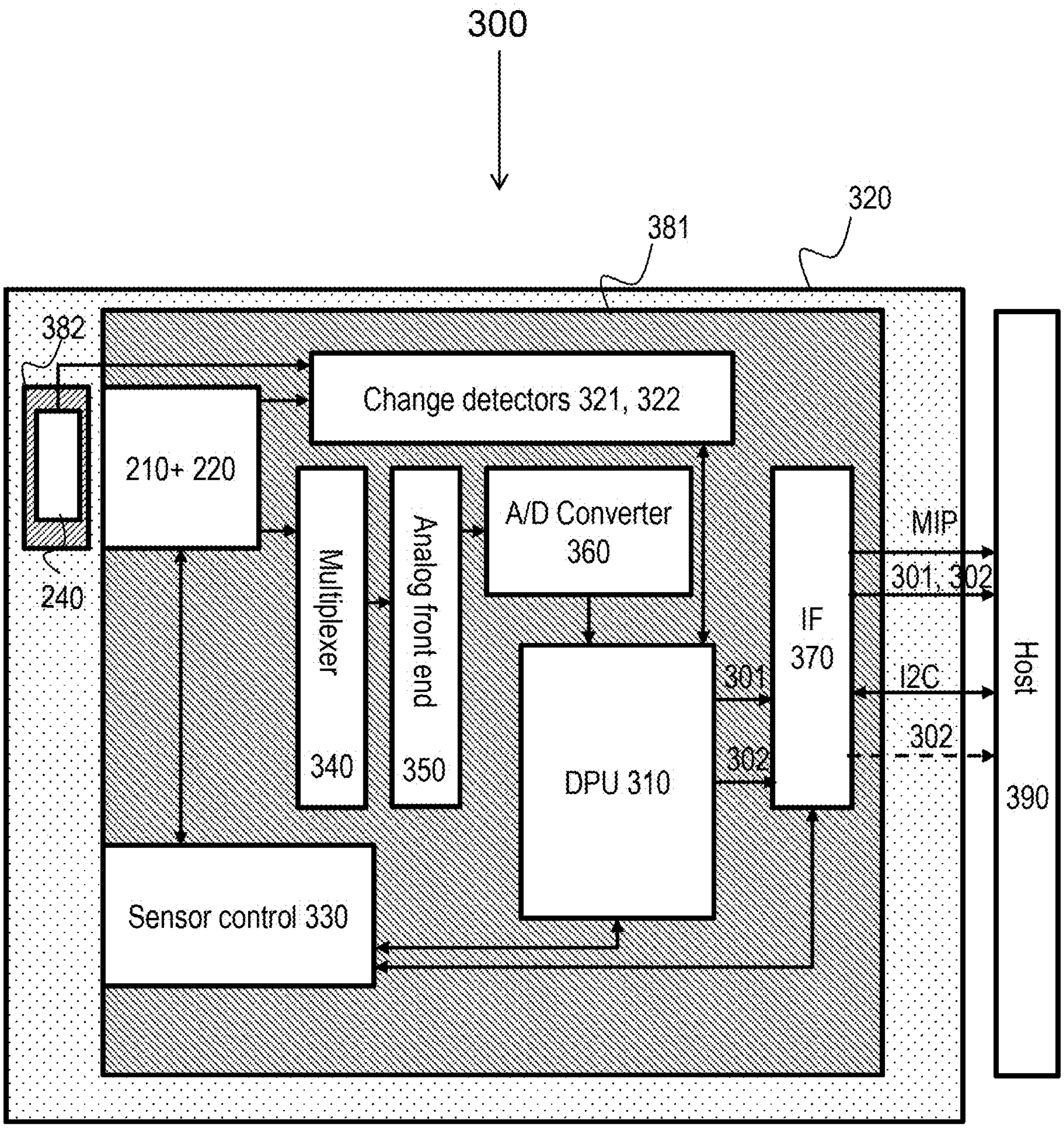
FIG. 3*b* illustrates further exemplifying embodiments of a camera module comprising an image sensor system.

FIG. 3*b* illustrate an alternative embodiment of the camera module 300 comprising the image sensor system 200 described above.

In FIG. 3*b* the first and second pixel areas 210, 220 are arranged on a first image sensor die 381 arranged on the printed circuit board 320 and the infrared pixel area 240 is arranged on a separate second image sensor die 382 arranged on the same printed circuit board 320. The first and second image sensor dies 381, 382 may be made from Si. As separate lens systems may be needed when separate sensor dies are used it is advantageous to arrange the first and second image sensor dies 381, 382 on the same printed circuit board 320 in order to meet the required tolerances between the different field of views.

An advantage with arranging the infrared pixel area 240 on the separate second image sensor die 382 is that a first lens system for the first and second pixel areas 210, 220 may be an off-the-shelf system that is used today and that a second lens system for the infrared pixel area 240 may also be an off-the-shelf system.

The infrared pixel area 240 may still be arranged as a frame around the first and second pixel areas 210, 220 or in some other way.

Also when the infrared pixel area 240 is arranged on the separate second image sensor die 382 the infrared pixels 241, 242 are directly connected to the first change detectors 231 on either the first image sensor die 381 or the second image sensor die 382. In other words, the image sensor die that do not comprise the change detector area 230 is directly connected to the image sensor die that does comprise the change detector area 230. Advantages of the direct connection is a quick response and an ultra-low power consumption. For example, the direct connection between the dies may be realized by direct wire bonding or direct connections through a PCB from connection points on the respective die.

Figure 3C:
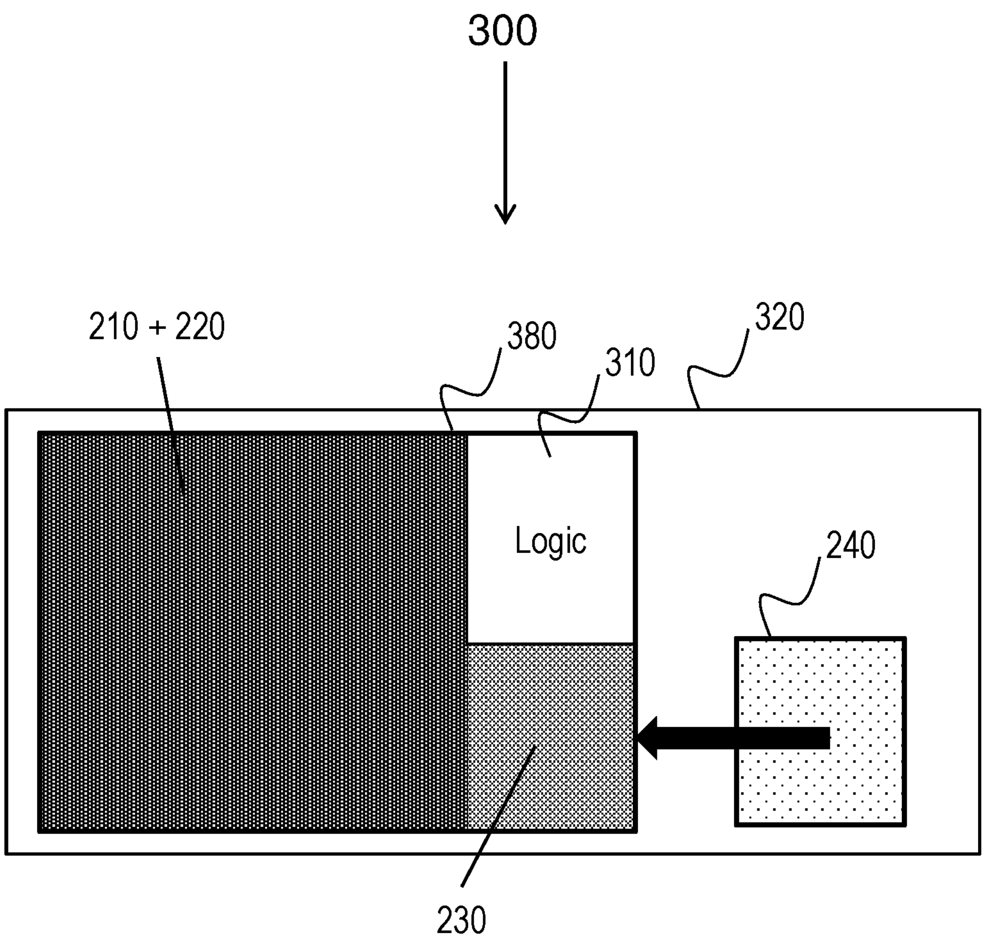
FIG. 3*c* illustrates further exemplifying embodiments of a camera module comprising an image sensor system.

FIG. 3*c* is an alternative illustration of the layout of FIG. 3*b*. The logic, such as the DPU 310, and the change detector area 230 may be integrated with the first pixel area 210 and the second pixel area 220 on the image sensor die 380. The infrared pixel area 240 is directly connected to the change detector area 230.

Figure 3D:
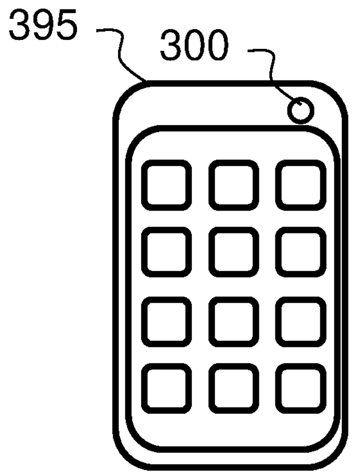
FIG. 3*d* illustrates exemplifying embodiments of an electronic device comprising a camera module.

Embodiments herein are also directed to an electronic device 395, schematically illustrated in FIG. 3*d*, comprising the camera module 300 described above. The electronic device 395 may for example be a consumer electronic device such as a mobile phone, a camera, a video camera, electronic eyewear, electronic clothing, and a smart watch. The electronic device 395 may also be a surveillance camera and a vehicle, such as a drone or a car. In some embodiments the electronic device 395 is a display or a smart wall.

Figure 4:
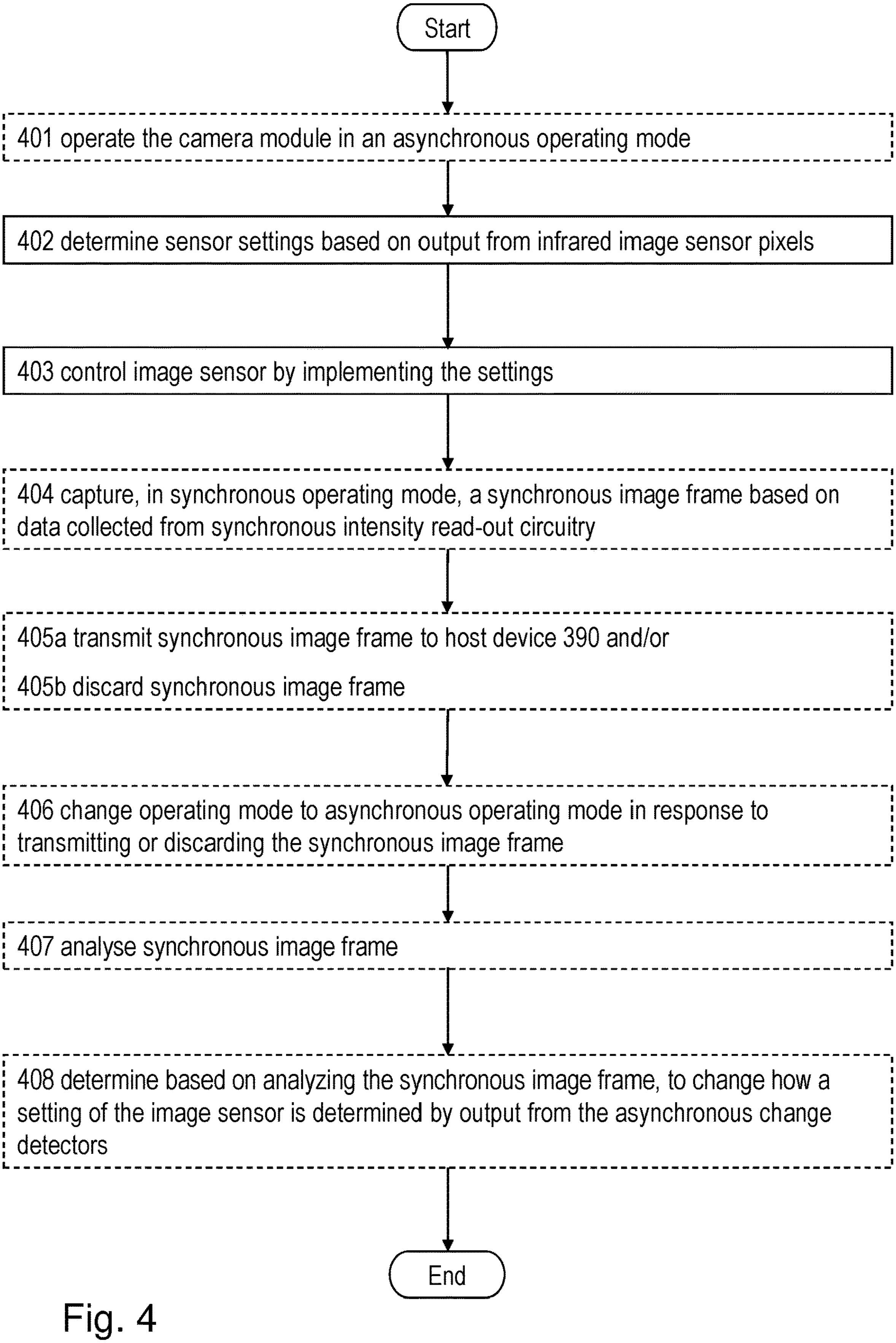
FIG. 4 is a flowchart illustrating embodiments of a method of operating a camera module.

Embodiments for operating the camera module 300 will now be described with reference to FIG. 4 which is a flow chart. The method may be performed by the camera module 300.

As mentioned above, the camera module 300 comprises the image sensor system 200. The camera module 300 comprises the image sensor system 200.

Action 401

The camera module 300 may operate or be operated in an asynchronous operating mode in which the camera module 300 reads output from the change detectors 231, 232. For example, the camera module 300 may operate or be operated in the asynchronous operating mode in which the camera module 300 reads output from the first asynchronous change detectors 231 coupled to the infrared sensor pixels 241, 242.

For example, the camera module 300 may operate or be operated in a first asynchronous operating mode in which the camera module 300 reads output from first asynchronous change detectors 231 coupled to the infrared sensor pixels 241, 242.

Action 402

The DPU 310 of the camera module 300 determines a setting of the image sensor system 200 based on output from the infrared image sensor pixels 241, 242.

In other words, the DPU 310 of the camera module 300 determines a setting of the image sensor system 200 based on output from the first asynchronous change detectors 231 comprised in the image sensor system 200. In some other embodiments the DPU 310 of the camera module 300 may determine a setting of the image sensor system 200 further based on output from the second asynchronous change detectors 232.

Determining the setting may comprise determining one or more of: a power setting, an exposure setting, a white balance setting, a focus setting, a resolution setting, an image size setting, and a frame rate.

In some embodiments herein the DPU 310 determines a characteristic of an object captured by the image sensor system 200 based on the output from the first asynchronous change detectors 231 and then determines the setting of the image sensor system 200 based on the characteristic.

In some other embodiments herein the DPU 310 determines a first characteristic of an object captured by the image sensor system 200 based on the output from the infrared image sensor pixels 241, 242, and then based on the first characteristic of the captured object the DPU 310 determines a second characteristic of the object captured by the image sensor system 200 based on the output from the hybrid second image sensor pixels 221, 222, and then the DPU 310 determines the setting of the image sensor system 200 based on the second characteristic of the captured object, or based on the first and/or the second characteristic of the captured object. That is, the DPU 310 may in response to the determining of the first characteristic and based on the first characteristic determine to determine the second characteristic of the object captured by the image sensor system 200. In other words, the DPU 310 may determine whether or not to determine the second characteristic of the object captured by the image sensor system 200 based on the first characteristic. Thus, the first characteristic may be used as a trigger to determine the second characteristic based on the output from the hybrid second image sensor pixels 221, 222. For example, if the first characteristic fulfills a certain requirement, such as being within a specific range, then the DPU 310 determines the second characteristic based on the output from the hybrid second image sensor pixels 221, 222. If, on the other hand, the first characteristic does not fulfill the above-mentioned certain requirement, such as being within the specific range, then the DPU 310 may determine not to determine the second characteristic. Since the determining of the second characteristic is conditioned based on the first characteristic the camera module (300) will save power with respect to a situation where the output from the hybrid second image sensor pixels 221, 222 are used unconditionally.

Examples of power settings is an on/off setting or low-power and high-power setting. In a low-power mode the image sensor system 200 may be operated in the asynchronous mode while in the high-power mode the image sensor system 200 may be operated in the synchronous mode in which high-resolution images may be captured.

For example, the DPU 310 may determine to activate the synchronous mode of the image sensor system 200. The power settings may be applied to the first pixel area 210 and/or the second pixel area 220.

Further, in some embodiments the DPU 310 determines a characteristic of an object captured by the image sensor system 200 based on the output from the asynchronous change detectors 231, 232 and then determines the setting of the image sensor system 200 based on the characteristic. The characteristic may be one or more of a movement of the object, direction of the movement, velocity of the object, size of the object, and shape of the object.

Action 403

The camera module 300 may control the image sensor system 200 by implementing the setting.

For example, in some embodiments disclosed herein the camera module 300 controls the image sensor system 200 by implementing the setting by changing operating mode from the first asynchronous operating mode to a second asynchronous operating mode in which the camera module 300 reads output from the second asynchronous change detectors 232 coupled to the hybrid sensor pixels 221, 222. Changing operating mode is then based on the output from the first asynchronous change detectors 231.

In the embodiments wherein the camera module 300 operate or is operated in the asynchronous operating mode in which the camera module 300 reads output from the first asynchronous change detectors 231 coupled to the infrared sensor pixels 241, 242, i.e., in the first asynchronous operating mode, controlling the image sensor system 200 by implementing the setting may comprise changing operating mode from the asynchronous operating mode to a synchronous operating mode in which the camera module 300 reads output from the synchronous intensity read-out circuitry. Changing operating mode may be based on the output from the first asynchronous change detectors 231.

In some embodiments controlling the image sensor system 200 by implementing the setting comprises changing operating mode from the asynchronous operating mode to the synchronous operating mode in which the camera module 300 reads output from the synchronous intensity read-out circuitry. Changing operating mode is then based on the output from the change detectors 231, 232, such as from the first asynchronous change detectors 231.

For example, based on the output from the change detectors 231, 232 the DPU 310 may detect a specific movement which triggers further analysis of the movement or of an image of the object that performs the movement. The DPU 310 may determine that the speed of the object is above a speed threshold and determines to change operating mode based on the speed fulfilling this trigger criterion. The DPU 310 may set settings of the image sensor system 200 to capture the object in an optimised way.

Action 404

The camera module 300 may capture, in the synchronous operating mode, a synchronous image frame based on the output from the synchronous intensity read-out circuitry 260.

In some embodiments the output from the asynchronous change detectors 231, 232 comprises a first output associated with a first infrared pixel 241 and/or first hybrid pixel 221 followed by a second output from a neighbouring infrared pixel 242 and/or hybrid pixel 222. Then the method may further comprise capturing multiple synchronous image frames with the synchronous intensity read-out circuitry 260 in response to detecting the output from the asynchronous change detectors 231, 232.

For example, if multiple change detectors 231, 232 each produces a respective output indicating a change in illumination of the respective infrared pixel 241, 242 and/or hybrid second pixel 221, 222 over some predetermined time, for example consistent over the predetermined time, then a series of high-resolution sensor frames may be captured. It may be sufficient that there is a consistent activation across neighboring infrared pixels 241, 242 and/or second image sensor pixels 221, 222, e.g., first an outer infrared pixel and/or second pixel 221 followed by a neighboring inner infrared pixel 242 and/or second pixel 222. For example, if a lot of changes occur in a scene, then that may indicate that the user wants to record a video, since there may be a lot of interesting things happening. In another example, if a lot of changes occur in the scene, then that may indicate that the user wants to ignore it, because the user is not interested in detecting changes when the camera is moving, only when the camera is static and something fitting a certain profile happens.

Action 405

In some embodiments the host device 390 is interrupted to query if it is interested of the object being captured by the image sensor system 200 based on e.g., speed vector, size and shape of the object. The camera module 300 may also take a high-resolution image of the object and store it internally before asking the host device 390. This may depend on what power and/or latency requirement a specific use case or application has. For example, this may depend on where and for what the camera module 300 is being used for. If the camera module 300 is comprised in a device connected to wall-power, then power requirements may not be important, but if the camera module 300 is comprised in a small battery-powered device, power requirements may be important. If the camera module 300 is comprised in a security camera, latency requirements may be relaxed, but if the camera module 300 is used for real-time sports-performance analysis, then latency requirements may be stricter compared to when the camera module 300 is comprised in a security camera.

The host device 390 may then decide if it requires an image or several images of the object or not. If the host device 390 requires the images, they may be sent over a high-speed interface such as the MIPI CSI.

If the camera module 300 already has stored the high-resolution image and the host device 390 doesn't require the image, then the camera module 300 may discard the image. Once the image is sent or discarded the image sensor system 200 and/or the camera module 300 may be put into change detector mode again, i.e., into the asynchronous mode. Thus, the camera module 300 may transmit the synchronous image frame to the host device 390 and/or discard the synchronous image frame.

Action 406

The camera module 300 may change operating mode from the synchronous operating mode to the asynchronous operating mode in response to transmitting or discarding the synchronous image frame.

Action 407

The camera module 300 may analyse the synchronous image frame. For example, in some embodiments, the captured high-resolution images as well as any captured high-resolution video stream may be analyzed by for example object detection algorithms in order to identify the moving object, its position and speed, and automatically adjust the settings of the camera module 300, in particular the settings of the image sensor system 200. For example, if it is recognized that the estimated velocity or direction of the moving objects, such as object, is often significantly wrong, trigger points for when to capture high-resolution images, the frame rate of the video capture, or how aggressively to crop the high-resolution images may be adjusted.

Such algorithms may be executed by the camera module 300 and/or in the application processor of the host device 390 that receives the high-resolution image stream from the camera module 300. In other embodiments, such algorithms may be executed at a cloud service, which may receive the captured high-resolution images and videos for analysis. The analysis may then trigger a change of the settings of the camera module 300, more specifically of the settings of the image sensor system 200.

Action 408

In some embodiments the camera module 300 determines, based on analysing the synchronous image frame, to change how the setting of the image sensor system 200 is determined by the output from the asynchronous change detectors 231, 232.

Figure 5A:
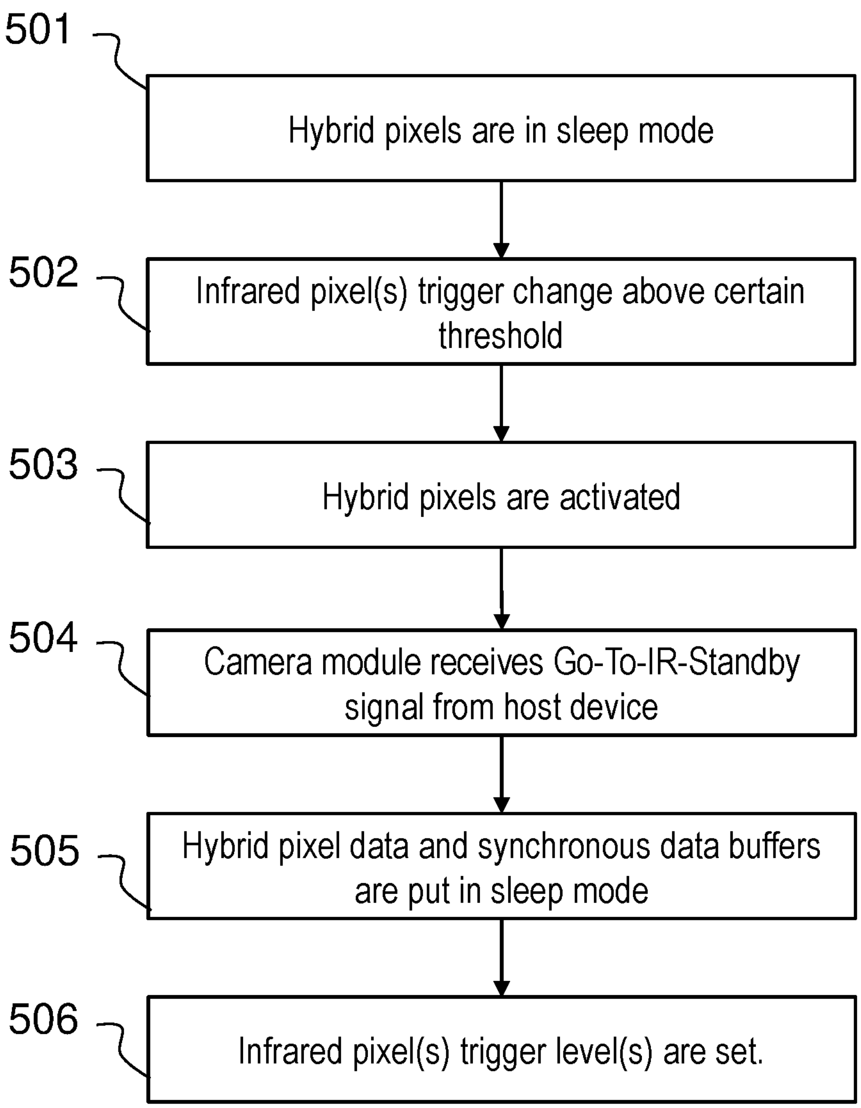
FIG. 5*a* illustrates exemplifying embodiments of a method of operating a camera module.

Further detailed embodiments for operating the camera module 300 will now be described with reference to FIG. 5*a*, which is a flow chart. The method may be performed by the camera module 300. The method may be performed without interrupting the host device 390. However, some of the described actions involve an interaction with the host device 390.

Action 501

In some embodiments herein the hybrid second image sensor pixels 221, 222 are in a sleep state. Also the interface to the host processor chip may be in a sleep state (e.g., no I/O energy consumption).

Action 502

Then a change in the scene at certain infrared frequencies, e.g., a person or animal moving is monitored by the IR pixels 241, 242 and detected by the first change detector(s) 231. The first change detector(s) 231 may detect changes above a threshold. The data from the first change detectors 231 may be processed by the internal DPU 310 of the camera module 300.

Action 503

The hybrid second image sensor pixels 221, 222 and the second change detector(s) 232 are activated based on the data from the first change detectors 231, e.g., based on movement in the image. The I/O to the host device may also be activated based on the data from the first change detectors 231.

Further, the data from the second change detector(s) 232 may be transferred to the host processor based on the data from the first change detectors 231, e.g., based on movement in the image.

Action 504

Based on the host processor analysis, the host device may at a later stage send a Go-To-IR-Standby signal to the camera module 300 comprising the image sensor system 200, meaning it deactivates the I/O and hybrid second image sensor pixels 221, 222. It may also mean that it re-activates the IR sensing and threshold monitoring if deactivated. This may be depending on use case where some use cases keep the IR sensing active continuously and share said IR data with the host.

Action 505

The Go-To-IR-Standby signal triggers a deactivation of the I/O and hybrid second image sensor pixels 221, 222. It may also mean that it re-activates the IR sensing and threshold monitoring if deactivated. This may be depending on use case where some use cases keep the IR sensing active continuously and share said IR data with the host.

Further, the Go-To-IR-Standby signal may trigger a deactivation of a data buffer for the hybrid pixels and a data buffer for the synchronous pixels, e.g., the data buffers may be put in sleep mode.

Action 506

Then the trigger level(s) of the infrared pixel(s) 241, 242 may be set. The trigger level(s) of the infrared pixel(s) 241, 242 may be set based on a specific temperature interval like the hybrid second pixels 221, 222 may be set on a luminance interval.

An advantage of the method embodiments above is that they reduce the power consumption in that the complete triggering is managed by the camera module 300, e.g., on-die, and no I/O transfer between the camera module 300 and the host processor is required unless when triggered by IR-based change detection. Thus, when the DPU 310 is integrated on the image sensor die 380, then no I/O transfer between the image sensor die 380 and the host processor is required unless when triggered by IR-based change detection.

However, very rapid movements leading up to the IR triggering event may not be captured as there may only be data from the hybrid pixels after the IR event. This is solved by embodiments below described in relation to FIG. 5*b*.

Action 511

In some embodiments herein pixel data, such as pixel data from the hybrid image sensor pixels 241, 242 (e.g., indicative of events or movement in the field of view) may be buffered in a circular buffer of the camera module 300. The content of the circular buffer may correspond to a few ms of duration (duration may depend on size of buffer, resolution of sensor, and amount of movement in a scene). Initially, this data is not transferred to the host processor.

Action 512

Then the first change detector(s) 231 associated with the IR image sensor pixels 241, 242 detect a change in the scene at certain frequencies, e.g., a person or animal moving. The first change detector(s) 231 may detect changes above a threshold.

Action 513

Transfer of the pixel data may be initiated and the buffered pixel data from the hybrid image sensor pixels 241, 242 as well as buffered pixel data from the IR image sensor pixels 241, 242 is transferred to the host processor for further processing.

Transfer of the pixel data may be initiated when the first change detector(s) 231 detect the change in the scene. The transmitted buffered pixel data from the hybrid image sensor pixels 241, 242 may be aligned in time with the transmitted buffered pixel data from the IR image sensor pixels 241, 242, such that they may be correlated.

Figure 5B:
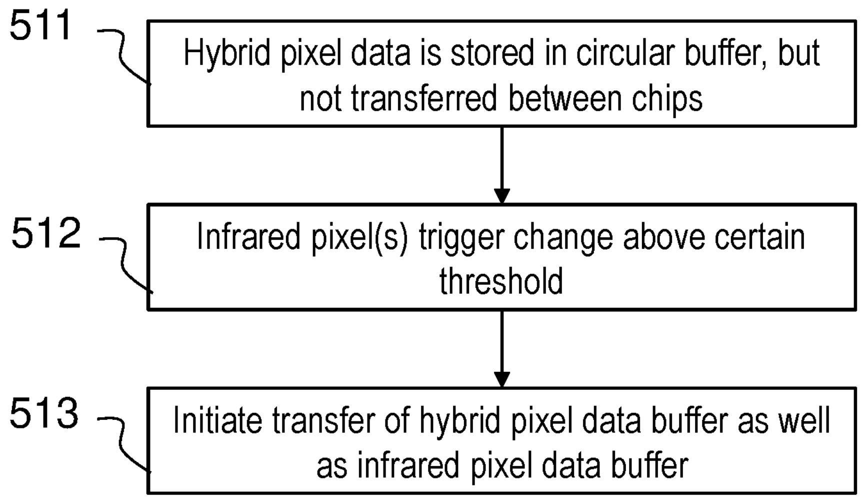
FIG. 5*b* illustrates exemplifying embodiments of a method of operating a camera module.

An advantage of the embodiments related to FIG. 5*b* is that they avoid inter-chip data transfers as well as host processor activities during periods when there are movements in the scene but not related to any heat changes. Examples include movements of tree leaves or branches that should not lead to activities, whereas the movements of people or animals should. The reduced data transfers reduce the power consumption.

In a reference solution comprising two separate sensors connected to the host processor, e.g., a standard DVS sensor and a standard IR sensor, the DVS data would always have to be activated in order not to introduce a latency from a time when the first IR data is detected, to a control signal is sent to activate the DVS sensor, and the reception of DVS data. Since the DVS sensor is substantially faster than the IR sensor, this may lead to missing a critical part of the heat-related activities. An alternative solution may be to have all data being transmitted always, and to store the DVS pixel data on the host processor, but this will lead to excessive power consumption.

Thus, a further advantage of the embodiments related to FIG. 5*b* is that they are able to capture very quick movements leading up to the detected heat change.

IR Triggered Partial Activation of DVS Matrix

One potential drawback of DVS sensors in scenes with a lot of movements is that they become limited by the I/O traffic since every pixel data must be accompanied by position data and since the potential rate of data may be very high (capturing very rapid movements in the scene). If not all types of movements are as relevant, e.g., shaking leaves on a tree, there is a lot of useless data sent limiting the frequency of updates of the relevant movements (as well as wasting energy).

Embodiments herein enable an IR-triggered partial activation of DVS pixel sensors, such as a partial activation of the hybrid second image sensor pixels 221, 222 and the associated second change detectors 232, or data transfer. In this mode, only the parts of the image sensor area close to the detected IR triggering event is activated, such as a part of the second pixel area 220: either by activating DVS sensors from sleep or by activating the data transfer. The size of this partial area may be smaller or larger depending on implementation.

Depending on whether there is an isolated IR-triggered event or multiple IR-triggered events spread out, that may further impact the control mechanism to activate only a sub-region of the DVS pixel area or the complete DVS pixel area. Deactivation (either turning off DVS data transfer from certain regions of the DVS pixel area or to put the DVS pixels in a region into sleep) may either occur based on an inactivity timer or by a control signal from the host processor.

Support for Different Trigger Activations

Depending on conditions, certain trigger conditions might be more or less relevant and/or efficient. For example, in very cold weather, certain humans may be well covered with clothes so an absolute temperature may be lower than in the summer but there may be a significant relative temperature difference. In a very hot room and industry area, it may be very hot so that the temperature trigger will always be active. Hence, there is a need to vary temperature trigger conditions depending on situation, and in certain situations rely more on movement than only on temperature.

The camera module 300 according to embodiments herein may be configured and used to trigger on changes originating from the infrared pixels and/or the hybrid pixels, thus based on heat changes or changes related to visible light. This may be relevant for surveillance cameras, such as.

- If there is an engine heating up in the scene, but no visual movement, that may be sensed.
- If there is for example a plate in a kitchen that is heated up or causes surroundings to heat up but no visible light is recorded (since the plate may be partially occluded) it would be sensed
- If there is a person moving behind a curtain, that may be visible, and not only a person in front of the curtain Furthermore, if the whole scene is warming up—for example as the sun rises—this may lead to a coherent change between temperature and light. This may be detected as no anomaly depending on control and logic.

According to some embodiments herein the infrared image sensor pixels 241, 242 are combined with change detectors on a single-die image sensor.

According to some embodiments herein the output from the infrared image sensor pixels 241, 242 control the hybrid DVS pixel sensor, e.g., the whole or parts of the hybrid DVS pixel sensor, directly on the image sensor die 380 which minimizes the amount of transmitted data to the host device 390. This enables a lower duty cycle of the receiving host processing chip. Such embodiments substantially reduce the power of the camera module 300 and/or the host device 390.

According to some embodiments herein DVS data streaming is enabled for certain thermal characteristics, e.g., a certain temperature level of an object and/or change in temperature. Further, some embodiments include buffering which enable capturing of fast changes by the hybrid second image sensor pixels 221, 222 compared to prior-art combinations of infrared and RGB sensors.

Some alternative embodiments herein disclose a multiple image sensor die solution, for situations or systems where a combined infrared and DVS sensor on single image sensor die is not feasible or preferred.

Some embodiments herein disclose an on-chip sensor control of the first pixel area 210, such as an RGB camera, based on change detection input from pixel elements in both the human visual spectrum and/or outside the human visual spectrum e.g., IR.

Advantages of some embodiments herein include:

Substantially reduced power consumption for asynchronous camera systems, such as DVS cameras systems, where an asynchronous and/or synchronous data stream is enabled by certain events in the scene with e.g., humans, animals, certain machinery, or chemical fluids of certain temperatures, etc.

Substantially faster capturing of such events compared to ordinary infrared sensors or combined infrared-RGB sensors, due to the possibility for very high-speed sensing of asynchronous cameras, such as DVS cameras.

Substantially lower cost and lower power consumption compared to a discrete solution where separate infrared and DVS sensors are included in the system, and where the data is transmitted to a host processing device that acts on the infrared data and DVS data it receives.

Enabling programmable triggers for when to send data streams; For example trigger a DVS data stream at certain temperature levels and/or temperature differences, certain movements, and/or a combination of temperature and movement patterns, e.g., temperature above X degrees and movement in direction Y.

Integrated low power image processing. Changes (due to infrared triggers) across the thermal sensor may be used to selectively enable an arbitrary image sensor area for sensing of luminance e.g., in some embodiments the camera module 300 may mask out an evenly heated background and only output event data related to image content that also include another trigger condition such as having a temperature gradient different from the background. This may be achieved by moving or panning the camera. Only working with a subset of an image may have a substantial reduction of the bandwidth and processing power needed for image recognition in later stages since a full image may be recreated based on historical data.

Further, the asynchronous sensor may detect events which automatically triggers a camera module comprising the sensors to adapt settings of the camera module, e.g., settings of the sensors and/or to activate the synchronous sensor. For example, the trigger may be based on detecting a heat signature with the infrared image sensor pixels 241, 242 and the first asynchronous change detector 231, possibly in combination with a luminance signature when the hybrid second image sensor pixels 221, 222 are used with the second change detector 232 as well.

A further application is to use the asynchronous pixels, such as the infrared image sensor pixels 241, 242 and or the hybrid second image sensor pixels 221, 222, to discriminate content or motion that has an amount of motion corresponding to a profile of what is being monitored such as moving humans, stationary equipment, weather phenomena and varying illumination of a scene e.g., night vision mode. With discriminating content is meant to discriminate for example moving objects of certain shape and/or size. However, also static objects may be discriminated, since these may be triggered due to a moving camera, or because of an illumination change. For example, it is possible to trigger the synchronous sensor if a human moves, while the synchronous sensor is not triggered if a dog moves. In another embodiment the synchronous sensor may be triggered if it is detected that an object is in motion, while the synchronous sensor is not triggered if the whole scene changes (probably indicating a moving camera and a static scene). For example, the event-based pixels may trigger on motion. Shape, size, direction and speed of moving object may be determined based on the speed of change of each independent pixel in a group of pixels with enough spatial resolution (e.g., in a 3×3 pattern around the boarder of the image sensor). Then it is possible to estimate the shape, speed and direction of something entering or exiting the field of view of the image sensor.

The profile mentioned above may be a database of shapes or a size or speed range. With embodiments herein it is possible to detect a square object and discriminate all objects that do not correspond to a profile corresponding to square objects (e.g., something round).

Thus, in embodiments herein any visual changes of the scene such as content and motion may trigger state changes of the change detectors. Scene changes may for example be caused by illumination changes, shadows, etc, which perhaps are not "relevant content". Such changes may be discriminated in favour of changes of the scene corresponding to a given profile, e.g., people-shaped objects.

Embodiments herein also provide for power savings as power to the synchronous sensor may be reduced.

The movements detected by the change detectors 231, 232 may automatically adapt the settings of the conventional sensor, e.g., in the following ways:

From inactive to active, due to a detected activity such as motion, shape or optical characteristics such as changes in light conditions.

From active at low frame rate to a higher frame rate (enable use with variable frame rate, potentially with lower resolution or color depth) depending on the speed of the detected motion into the field-of-view (FOV).

Activation of only a part of the conventional sensor depending on how large the motion is, where it is, and its estimated trajectory (which later may be adjusted by the analysis of the high-resolution image sensor data).

Moderate the amount of sensing in terms of rate and resolution (instances of using more power demanding invocation of conventional sensor array) in accordance to a desired power profile such as battery saver mode or performance mode operation. For example, in some embodiments the camera module 300 is configured with different power profiles.

Based on which of the power profiles that is a currently used power profile the object that is detected may change the sensor settings in different ways. High-power mode may lead to using full resolution and full frame rate whereas a low-power mode may set the image sensor system 200 to half resolution and one fourth of maximum frame rate even though it is the same object entering the scene.

Based on the speed vector that may be calculated the camera sensor settings may be adjusted accordingly to adapt to a speed of an object, e.g., if it is important to capture the object with optimised settings (exposure, focus, white balance).

Depending on the speed of the change detection (presumably much higher than the speed of the synchronous readout), more than 2 rows of pixels coupled to the change detectors 231, 232 may be needed to estimate trajectories rather than just detecting the appearance of movement and the distribution of the object moving into the field-of-view.

Besides the functionality for activating the conventional image sensor based on changes in the field-of-view, there are other also more specific use cases enabled:

Detect movement (e.g., shaking) of the camera module 300 by the detection of movements in the image sensor itself, and when the device is still (i.e., movement below a certain threshold) and a picture will be captured by the conventional sensor. This can then be managed directly in the sensor circuit board (or silicon die), e.g., by the DPU 310, instead of via an application processor that would require utilizing input from an inertial motion unit (IMU) and/or an accelerometer. For example, the change detector triggers from pixels at different locations (spatially separated) may be analysed in order to determine if an image sensor is rotating or moved in a certain way. This may be used instead of using an accelerometer. A pre-requisite may be that there are features (intensity changes) in the scene that trigger the change detectors.

Detect movement of objects by the detection of movements in the scene as detected by the change detectors 231, 232.

A yet further advantage is a possibility to improve motion sensitivity at low light conditions. For example, embodiments herein may dynamically use the event data of the change detectors to adjust an exposure of a synchronous image to accommodate for motions that would otherwise not be detected if the synchronous pixels are set to a fixed exposure value. Embodiments herein make it possible for the synchronous pixels to benefit from the speed and sensitivity of the event pixels. Thus embodiments take advantage of the hybrid image sensor comprising both a synchronous image sensor and an asynchronous image sensor.

Figure 6:
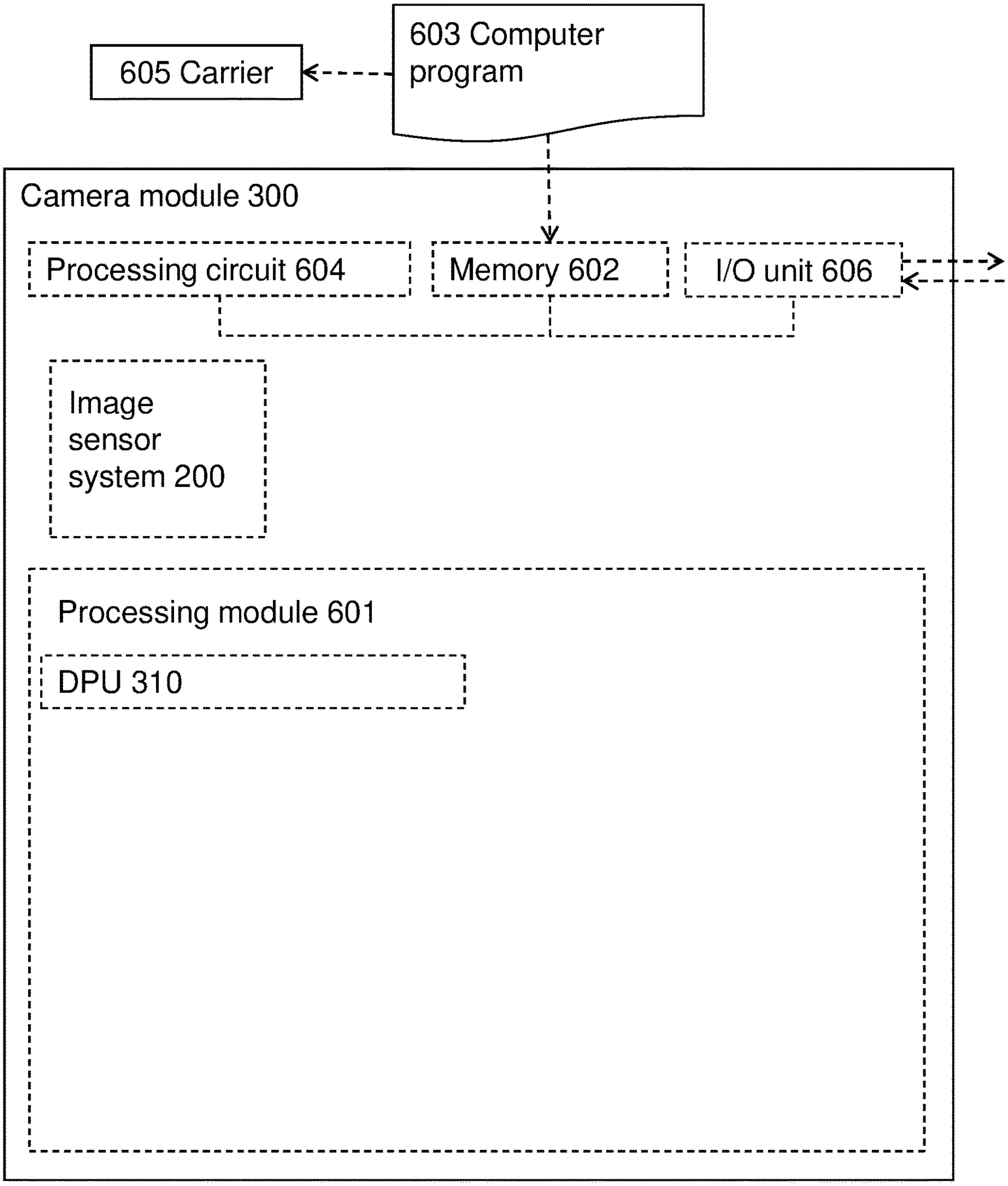
FIG. 6 is a schematic block diagram illustrating embodiments of a camera module.

FIG. 6 illustrates a supplementary schematic block diagram of embodiments of the camera module 300.

As mentioned above the camera module 300 comprises the image sensor system 200 and may comprise any of the components described as part of the camera module 300 in connection with FIG. 3*a* or FIG. 3*b*.

In some embodiments the camera module 300 comprises a processing module 601 configured to perform the above method actions. The processing module 601 may e.g., comprise the DPU 310.

The embodiments herein may also be implemented through a processing circuit 604 e.g. comprising one or more processors, in the camera module 300 depicted in FIG. 6, together with computer program code, e.g. computer program, for performing the functions and actions of the embodiments herein. The program code mentioned above may also be provided as a computer program product, for instance in the form of a data carrier carrying computer program code for performing the embodiments herein when being loaded into the camera module 300. One such carrier may be in the form of a CD ROM disc. It is however feasible with other data carriers such as a memory stick. The computer program code may furthermore be provided as pure program code on a server and downloaded to the camera module 300.

The camera module 300 may further comprise a memory 602 comprising one or more memory units. The memory 602 comprises instructions executable by the processing circuit 604 in the camera module 300. The memory 602 is arranged to be used to store e.g. information, indications, data, configurations, and applications to perform the methods herein when being executed in the camera module 300. The memory 602 may be a non-volatile memory e.g., comprising NAND gates, from which the camera module 300 may load its program and relevant data. Updates of the software may be transferred via a wireless connection.

To perform the actions above, embodiments herein provide a computer program 603, comprising computer readable code units which when executed on the camera module 300 causes the camera module 300 to perform any of the method actions above.

In some embodiments, the computer program 603 comprises instructions, which when executed by a processor, such as the processing circuit 604 of the camera module 300, cause the processor to perform any of the method actions above.

In some embodiments, a carrier 605 comprises the computer program 603 wherein the carrier 605 is one of an electronic signal, an optical signal, an electromagnetic signal, a magnetic signal, an electric signal, a radio signal, a microwave signal and a computer-readable storage medium.

To perform the method actions above, the camera module 300 may comprise an Input and Output (I/O) unit 606. The I/O unit 606 may further be part of one or more user interfaces.

Those skilled in the art will appreciate that the modules and/or units in the camera module 300 described above may refer to a combination of analog and digital circuits, and/or one or more processors configured with software and/or firmware, e.g., stored in the camera module 300, that when executed by, e.g., the processing circuit 604, above causes the camera module 300 to perform the method actions above. The processing circuit 604, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "module" and the term "unit" may refer to one or more functional modules or units, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a cavity-providing means, electrical interconnect-providing means and arranging means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A monolithic image sensor system sensitive to electromagnetic irradiation and comprising:
- a first pixel area comprising an array of synchronous first image sensor pixels and an infrared pixel area comprising infrared image sensor pixels sensitive to infrared irradiation,
- a change detector area comprising multiple asynchronous change detectors, and
- a synchronous intensity read-out circuitry,
- wherein a first electromagnetic receptor of a respective first image sensor pixel is electrically coupled to the synchronous intensity read-out circuitry,
- and wherein an infrared detector of a respective infrared image sensor pixel is electrically coupled to a respective first asynchronous change detector out of the multiple asynchronous change detectors,
- wherein the change detector area is a distinct part of the monolithic image sensor system which is separate from the pixel areas,
- wherein the infrared pixel area is arranged to at least partly surround the first pixel area, and
- wherein the change detector area is arranged to at least partly surround the pixel areas.

2. The monolithic image sensor system of claim 1, further comprising a second pixel area comprising hybrid second image sensor pixels, wherein a second electromagnetic receptor of a respective hybrid second image sensor pixel is electrically coupled to the synchronous intensity read-out circuitry with a first connection and electrically coupled to a respective second asynchronous change detector out of the multiple asynchronous change detectors with a second connection.

3. The monolithic image sensor system of claim 1, wherein the infrared pixel area is arranged to at least partly surround the first pixel area and the second pixel area.

4. The monolithic image sensor system of claim 1, wherein the infrared image sensor pixels are sensitive to infrared irradiation within mid-wavelength infrared and/or long-wavelength infrared, such as within a wavelength span 1000 nm to 14000 nm, specifically within a wavelength span 5000 nm to 14000 nm, more specifically to a wavelength span 7000 nm to 12000 nm.

5. The monolithic image sensor system of claim 1, wherein the first image sensor pixels are sensitive to electromagnetic irradiation within a wavelength span visible to humans, such as 380-800 nm.

6. A camera module comprising the monolithic image sensor system of claim 1.

7. The camera module of claim 6, further comprising a Digital Processing Unit (DPU) configured to:
- determine a setting of the monolithic image sensor system based on output from the infrared image sensor pixels, and
- control the monolithic image sensor system by implementing the setting,
- wherein the setting comprises one or more of: a power setting, an exposure setting, a white balance setting, a resolution setting, an image size setting, and a frame setting.

8. The camera module of claim 6, configured to:
- determine a characteristic of an object captured by the monolithic image sensor system based on the output from the infrared sensor pixels, and then determine the setting of the monolithic image sensor system based on the characteristic, wherein the characteristic is one or more of: velocity, shape, size and position of the object.

9. The camera module of claim 6, configured to:

determine a first characteristic of an object captured by the monolithic image sensor system based on the output from the infrared image sensor pixels, and then based on the first characteristic of the captured object determine a second characteristic of the object captured by the monolithic image sensor system based on the output from the hybrid second image sensor pixels, and then determine the setting of the monolithic image sensor system based on the second characteristic of the captured object, or based on the first and the second characteristic of the captured object.

10. The camera module of claim 6, configured to:

operate the camera module in an asynchronous operating mode in which the camera module reads output from the first asynchronous change detectors coupled to the infrared sensor pixels, and control the monolithic image sensor system by implementing the setting by being configured to change operating mode from the asynchronous operating mode to a synchronous operating mode, in which the camera module reads output from the synchronous intensity read-out circuitry, based on the output from the first asynchronous change detectors.

11. The camera module of claim 6, further comprising a single lens system for both the first pixel area and the infrared pixel area.

12. An electronic device comprising the camera module of claim 6.

13. The electronic device of claim 12, wherein the electronic device is any of a mobile phone, a camera, a video camera, a surveillance camera, electronic eyewear, electronic clothing, a smartwatch and a vehicle.

14. A method for operating a camera module according to claim 6, wherein the method comprises:

determining, by a Digital Processing Unit (DPU) of the camera module, a setting of the monolithic image sensor system based on output from the infrared image sensor pixels, and controlling the monolithic image sensor system by implementing the setting, wherein the setting comprises one or more of: a power setting, an exposure setting, a white balance setting, a resolution setting, an image size setting, and a frame setting.

15. The method of claim 14, wherein the DPU determines a characteristic of an object captured by the monolithic image sensor system based on the output from the first asynchronous change detectors and then determines a setting of the monolithic image sensor system based on the characteristic, wherein determining the setting comprises one or more of: a power setting, an exposure setting, a white balance setting, a resolution setting, an image size setting, and a frame setting, and wherein the characteristic is one or more of: velocity, shape, size and position of the object.

16. The method of claim 14, further comprising:

operating the camera module in an asynchronous operating mode in which the camera module reads output from the first asynchronous change detectors coupled to the infrared sensor pixels, and wherein controlling the monolithic image sensor system by implementing the setting comprises changing operating mode from the asynchronous operating mode to a synchronous operating mode in which the camera module reads output from the synchronous intensity read-out circuitry, wherein changing operating mode is based on the output from the first asynchronous change detectors.

17. A non-transitory computer-readable medium comprising, stored thereupon, a computer program comprising computer readable code units configured so that when executed on a camera module the computer program causes the camera module to perform the method of claim 14.

* * * * *